United States Patent
Yang

(10) Patent No.: US 8,381,541 B2
(45) Date of Patent: Feb. 26, 2013

(54) AIR CONDITIONING DEVICE UTILIZING TEMPERATURE DIFFERENTIATION OF EXHAUSTED GAS TO EVEN TEMPERATURE OF EXTERNAL HEAT EXCHANGER

(76) Inventor: Tai-Her Yang, Dzan-Hwa (TW)

(*) Notice: Subject to any disclaimer, the term of this patent is extended or adjusted under 35 U.S.C. 154(b) by 0 days.

(21) Appl. No.: 13/313,098

(22) Filed: Dec. 7, 2011

(65) Prior Publication Data

US 2012/0137716 A1    Jun. 7, 2012

Related U.S. Application Data

(63) Continuation-in-part of application No. 12/961,585, filed on Dec. 7, 2010.

(51) Int. Cl.
    *F25B 27/00*    (2006.01)
(52) U.S. Cl. .................................. 62/238.7; 62/324.1
(58) Field of Classification Search ................ 62/238.7, 62/314, 324.1; 165/59, 185
    See application file for complete search history.

(56) References Cited

U.S. PATENT DOCUMENTS

| 3,668,887 A * | 6/1972 | Riello ............................. 62/262 |
| 2011/0048055 A1 * | 3/2011 | Fujimoto et al. ............. 62/324.6 |

* cited by examiner

*Primary Examiner* — Melvin Jones
(74) *Attorney, Agent, or Firm* — Bacon & Thomas, PLLC

(57) ABSTRACT

This invention relates to a cooling/heating air conditioning device for regulating temperature, which pumps an airflow exhausted from a space in an air conditioning object such as inside of a room or vehicle to the external through the external heat exchanger disposed at the external of the air conditioning object such as outside of the room or vehicle so as to equalize the temperature of the fluid flowing through the internal of the external heat exchanger by means of the temperature difference between the internal and external of the air conditioning object for achieving an energy saving effect.

25 Claims, 12 Drawing Sheets

AIR CONDITIONING DEVICE UTILIZING TEMPERATURE DIFFERENTIATION OF EXHAUSTED GAS TO EVEN TEMPERATURE OF EXTERNAL HEAT EXCHANGER

CROSS-REFERENCE TO RELATED APPLICATION

This application is a Continuation-In-Part of my patent application Ser. No. 12/961,585, filed on Dec. 7, 2010.

BACKGROUND OF THE INVENTION (a) Field of the Invention

This invention relates to a cooling/heating air conditioning device for regulating temperature, which pumps an airflow exhausted from a space in an air conditioning object such as inside of a room or vehicle to the external through the external heat exchanger disposed at the external of the air conditioning object such as outside of the room or vehicle so as to equalize the temperature of the fluid flowing through the internal of the external heat exchanger by means of the temperature difference between the internal and external of the air conditioning object for achieving an energy saving effect.

(b) Description of the Prior Art

Conventionally, during the use of a cooling/heating air conditioning device, due to the need for external ventilation, vent holes are typically disposed in a window type air conditioning device to perform the external ventilation, alternatively, a window type main unit is cooperated with a ventilating device such as a ventilator or total heat exchanging ventilating device to perform the external ventilation. However, the pity is that, heretofore, when the aforementioned window type air conditioning device or split type air conditioning device is operated as a cooler, the airflow of a relatively lower temperature exhausted from the space of an air conditioning object such as inside of a room has not been used to facilitate the decreasing of the temperature of an external heat exchanger which is disposed outdoors as a condenser, and when the air conditioning device is operated as a heater, the exhausted airflow of a relatively higher temperature has not been used to facilitate the increasing of the temperature of the external heat exchanger which is disposed outdoors as an evaporator.

SUMMARY OF THE INVENTION

This invention relates to a cooling/heating air conditioning device for regulating temperature, which pumps an airflow exhausted from a space in an air conditioning object such as inside of a room or vehicle to the external through the external heat exchanger disposed at the external of the air conditioning object such as outside of the room or vehicle so as to equalize the temperature of the fluid flowing through the internal of the external heat exchanger device by means of the temperature differentiation between the two fluids. When the air conditioning device is operated as a cooler, the airflow of a relatively lower temperature exhausted from the space of the air conditioning object such as the inside of the room can be used to facilitate the decreasing of the temperature of the external heat exchanger which is disposed outdoors as a condenser, and when the air conditioning device is operated as a heater, the exhausted airflow of a relatively higher temperature can be used to facilitate the increasing of the temperature of the external heat exchanger which is disposed outdoors as an evaporator; the characteristic of energy saving of the present invention is applicable in the internal or external space of a gas-state cooling/warming air conditioning device or liquid-state temperature regulating device installed in a fixed member such as the internal of an architecture, factory, public building or camp; or applicable in the internal or external space of a gas-state cooling/warming air conditioning device or liquid-state temperature regulating device installed in a moveable member such as a road vehicle, rail vehicle or aircraft; or applicable in the internal or external space of a gas-state cooling/warming air conditioning device or liquid-state temperature regulating device installed in an equipment device.

Figure 1:
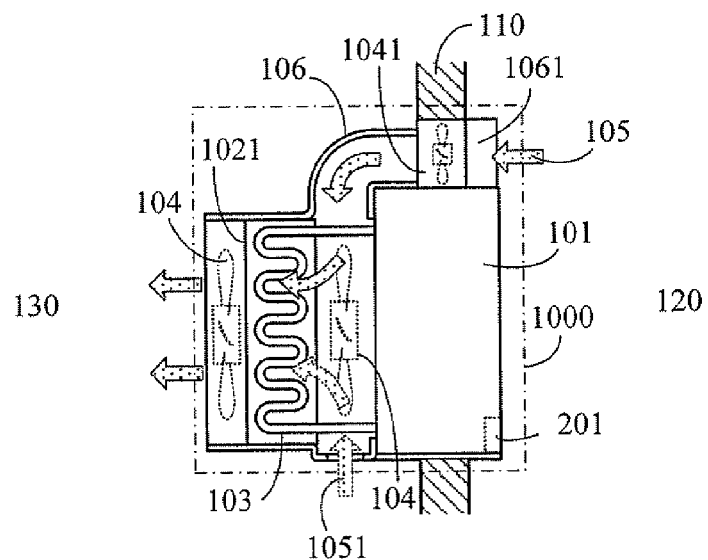
FIG. 1 is a diagram of the operating principles of this invention illustrated by the integral air conditioning device.

DESCRIPTION OF MAIN COMPONENT SYMBOLS 101 air conditioning device main unit
103: coolant fluid pipeline
104: external heat exchanger airflow exhausting fan unit
105: air conditioning object space exhausted fluid
106: fluid exhausting path
107: water pipe
108: cooling tower fan unit
109: water in and out pipe
110: thermal insulation device
111: water pump
120: air conditioning object space
130: external temperature differentiation space
201: control device
202: airflow regulating device
203: internal heat exchanger
204: conditioned airflow blowing fan
1000: air conditioning device assembly
1021: external heat exchanger
1041: blowing pump
1051: external airflow
1060: fluid exhausting path
1061: exhaust amount regulating device
2001: split type air conditioning device main unit
2002: split type air conditioning device outdoor unit
2003: powered fan provided cooling tower
2004: natural draft cooling tower
2005: water-cooled air conditioning device main unit
2006: split type air conditioning device indoor unit
2007: split type air conditioning device outdoor main station

DETAILED DESCRIPTION OF THE PREFERRED EMBODIMENTS

Conventionally, during the use of a cooling/heating air conditioning device, due to the need for external ventilation, vent holes are typically disposed in a window type air conditioning device to perform the external ventilation, alternatively, a window type main unit is cooperated with a ventilating device such as a ventilator or total heat exchanging ventilating device to perform the external ventilation. However, the pity is that, heretofore, when the aforementioned window type air conditioning device or split type air conditioning device is operated as a cooler, the airflow of a relatively lower temperature exhausted from the space of an air conditioning object such as inside of a room has not been used to facilitate the decreasing of the temperature of an external heat exchanger which is disposed outdoors as a condenser, and when the air conditioning device is operated as a heater, the exhausted airflow of a relatively higher temperature has not been used to facilitate the increasing of the temperature of the external heat exchanger which is disposed outdoors as an evaporator.

This invention relates to a cooling/heating air conditioning device for regulating temperature, which pumps the air conditioning object space exhausted fluid (105) in an air conditioning object such as the indoor or the internal of a vehicle, and/or pumps the external airflow (1051) through the external heat exchanger (1021) disposed at the external of the air conditioning object such as the outdoor or the outside of a vehicle, so as to perform heat exchange with the coolant fluid pipeline (103) passing through the internal of the external heat exchanger device by means of the temperature differentiation between the two fluids. When the air conditioning device is operated as a cooler, the airflow of a relatively lower temperature exhausted from the space of the air conditioning object such as the inside of the room can be used to facilitate the decreasing of the temperature of the external heat exchanger which is disposed outdoors as a condenser, and when the air conditioning device is operated as a heat pump to supply hot air, the exhausted airflow of a relatively higher temperature can be used to facilitate the increasing of the temperature of the external heat exchanger which is disposed outdoors as an evaporator; the characteristic of energy saving of the present invention is applicable in the internal or external space of a gas-state cooling/warming air conditioning device or liquid-state temperature regulating device installed in a fixed member such as the internal of an architecture, factory, public building or camp; or applicable in the internal or external space of a gas-state cooling/warming air conditioning device or liquid-state temperature regulating device installed in a moveable member such as a road vehicle, rail vehicle or aircraft; or applicable in the internal or external space of a gas-state cooling/warming air conditioning device or liquid-state temperature regulating device installed in an equipment device.

FIG. 1 is a diagram of the operating principles of this invention illustrated by the integral air conditioning device.

As illustrated in FIG. 1, the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having exhaust amount regulating device (1061) and a fluid exhausting path (1060) for the air conditioning object space exhausted fluid (105) to flow through, and further to exhaust to the external temperature differentiation space (130) through the external heat exchanger (1021);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

a blowing pump (1041) or an external heat exchanger airflow exhausting fan unit (104) is installed at one or more than one of the three locations including the fluid exhausting path (1060) or the inlet side or the outlet side of the external heat exchanger (1021), so as to pump the air conditioning object space exhausted fluid (105) to exhaust to the external temperature differentiation space (130) through the external heat exchanger (1021);

said external heat exchanger airflow exhausting fan unit (104) and said blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the fluid exhausting path (1060), or for simultaneously pumping the air conditioning object space exhausted fluid (105) and the external airflow (1051), so as to exhaust to the external temperature differentiation space (130) through the external heat exchanger (1021), enabling two airflows to exhaust to the external temperature differentiation space (130) through the external heat exchanger (1021);

the coolant fluid pipeline (103), which is a circulation pipeline device for coupling the air conditioning device main unit (101) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105);

This operating principles thereof are as follows:

When operated as the function to supply cold air to the air conditioning object space (120), if the temperature of an external temperature differentiation space (130) where the external heat exchanger (1021) is located is higher, and the external airflow (1051) is pumped only by the external heat exchanger airflow exhausting fan unit (104), it is difficult to release heat from the coolant in the coolant fluid pipe (103) disposed in the external heat exchanger (1021), thereby by utilizing both or one of the external heat exchanger airflow exhausting fan unit (104) and/or the exhaust amount regulating device (1061) to pump the air conditioning object space exhausted fluid (105) at a relatively lower temperature in an indoor air conditioning object space (120), or simultaneously pump the air conditioning object space exhausted fluid (105) and the external airflow (1051) flowing through the external heat exchanger (1021), the effect of lowing the temperature of the external heat exchanger (1021) is enhanced, and thereby facilitating the enhancing of the cooling air conditioning efficiency;

on the contrary, when operated as an heat pump function to supply hot air to the air conditioning object space (120), by pumping the air conditioning object space exhausted fluid (105) having relatively higher temperature to the external heat exchanger (1021) through the external heat exchanger (1021), the effect of raising the temperature of the external heat exchanger (1021) is enhanced, and thereby facilitating to enhance the heating air conditioning efficiency;

The air conditioning device utilizing temperature differentiation of exhausted gas to even temperature of external heat exchanger of the present invention includes to pump the airflow passing through the external of the external heat exchanger (1021) by means of the external heat exchanger airflow exhausting fan unit (104), and for the blowing pump (1041);

According to the air conditioning device utilizing temperature differentiation of exhausted gas to even temperature of external heat exchanger, with a thermal insulation device (110) constructed in the object location, the air conditioning object space (120) and the external temperature differentiation space (130) can be insulated, the thermal insulation structure (110) includes the wall of a building, the housing of a carrier or the enclosure of a mechanism made of a heat insulation material or a material having even better heat insulation properties;

According to the air conditioning device utilizing temperature differentiation of exhausted gas to even temperature of external heat exchanger, the mentioned air conditioning object space (120) is often defined as the internal of a building or the internal of a vehicle or the internal of a boat or the internal of an aircraft or the internal of an equipment device, which allows the air conditioning device to perform temperature-raising regulation or temperature-lowering regulation; the mentioned air conditioning object space exhausted fluid (105) is defined as the airflow exhausted from the internal of the air conditioning object space (120) and flowing through the external heat exchanger (1021);

According to the air conditioning device utilizing temperature differentiation of exhausted gas to even temperature of external heat exchanger, the mentioned external temperature differentiation space (130) is defined as the external space insulated from the air conditioning object space (120) through the thermal insulation device (110);

According to the air conditioning device utilizing temperature differentiation of exhausted gas to even temperature of external heat exchanger, the mentioned external airflow (1051) is defined as the airflow surrounding the external temperature differentiation space (130);

In the air conditioning device utilizing temperature differentiation of exhausted gas to even temperature of external heat exchanger, the temperature of the air conditioning object space exhausted fluid (105) includes higher than that of an heat exchanger to the external disposed externally of an temperature regulator;

In the air conditioning device utilizing temperature differentiation of exhausted gas to even temperature of external heat exchanger, the temperature of the air conditioning object space exhausted fluid (105) includes lower than that of an heat exchanger to the external disposed externally of an temperature regulator;

In the air conditioning device utilizing temperature differentiation of exhausted gas to even temperature of external heat exchanger, the exhausted air conditioning object space exhausted fluid (105) includes to heat exchange with the coolant fluid pipeline (103) disposed in the external heat exchanger (1021) in the external space or a surface of the external heat exchanger (1021);

The air conditioning device utilizing temperature differentiation of exhausted gas to even temperature of external heat exchanger of the present invention is formed by applying the aforementioned operating principles to various types of air conditioning devices including integral air conditioning devices, or split type air conditioning devices, or using the cooling tower to replace the cooling tower type air conditioning device of the external heat exchanger (1021).

Figure 2:
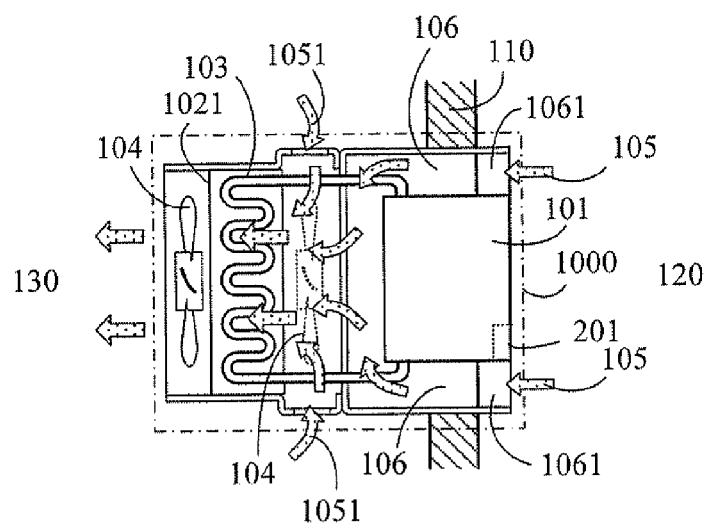
FIG. 2 is a structural schematic view of an embodiment of present invention having an integral air conditioning device with an external heat exchanger airflow exhausting fan unit (104) and a fluid exhausting path (106) so as to pump an air conditioning object space exhausted fluid (105) and an external airflow (1051) to flow together through an external heat exchanger (1021).

Several embodiments of the air conditioning device utilizing temperature differentiation of exhausted gas to even temperature of external heat exchangers of the present invention are described as follows:

FIG. 2 is a structural schematic view of an embodiment of present invention having an integral air conditioning device with an external heat exchanger airflow exhausting fan unit (104) and a fluid exhausting path (106) so as to pump an air conditioning object space exhausted fluid (105) and an external airflow (1051) to flow together through an external heat exchanger (1021).

As illustrated in FIG. 2, the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having an exhaust amount regulating device (1061), and a fluid exhausting path (106) formed by a housing for allowing air conditioning object space exhausted fluid (105) to flow to the external heat exchanger (1021);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the fluid exhausting path (106), enabling two airflows to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (106), which is a fluid passage structure for permitting the exhaust of the air conditioning object space exhausted fluid (105);

whereby an integral air conditioning device assembly (1000) is formed by the abovementioned structures.

Figure 3:
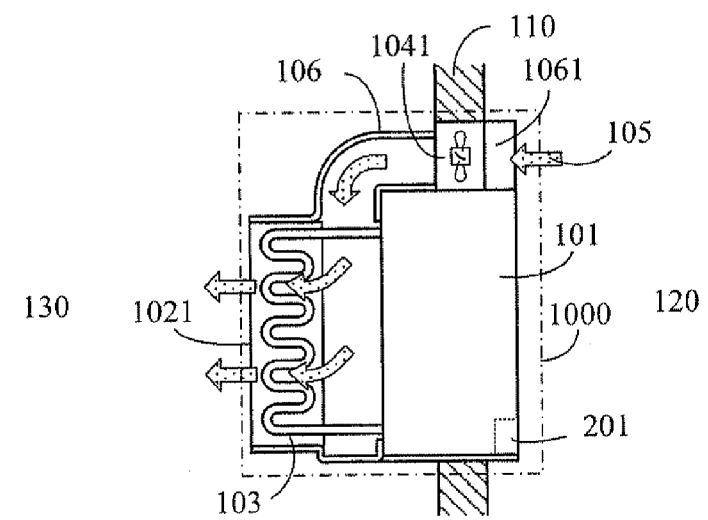
FIG. 3 is a structural schematic view of an embodiment of present invention having an integral air conditioning device without a heat exchanger airflow exhausting fan unit (104) and a ventilating device (1041) commonly constructed with a fluid exhausting path (106) so as to pump an air conditioning object space exhausted fluid (105) to flow through an external heat exchanger (1021).

FIG. 3 is a structural schematic view of an embodiment of present invention having an integral air conditioning device without a heat exchanger airflow exhausting fan unit (104) and a ventilating device (1041) commonly constructed with a fluid exhausting path (106) so as to pump an air conditioning object space exhausted fluid (105) to flow through an external heat exchanger (1021).

As illustrated in FIG. 3, the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (106) formed by a housing, and having an exhaust amount regulating device (1061) and the blowing pump (1041);

the external heat exchanger (1021), provided with the coolant fluid pipeline (103) for allowing the coolant passed from the main unit to heat exchange with the air conditioning object space exhausted fluid (105) through the external heat exchanger (1021);

the coolant fluid pipeline (103), which is a circulation pipeline device for coupling the air conditioning device main unit (101) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the fluid exhausting path (106), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (106), which is a fluid passage structure for permitting the exhaust of the air conditioning object space exhausted fluid (105);

whereby an integral air conditioning device assembly (1000) is formed by the abovementioned structures.

Figure 4:
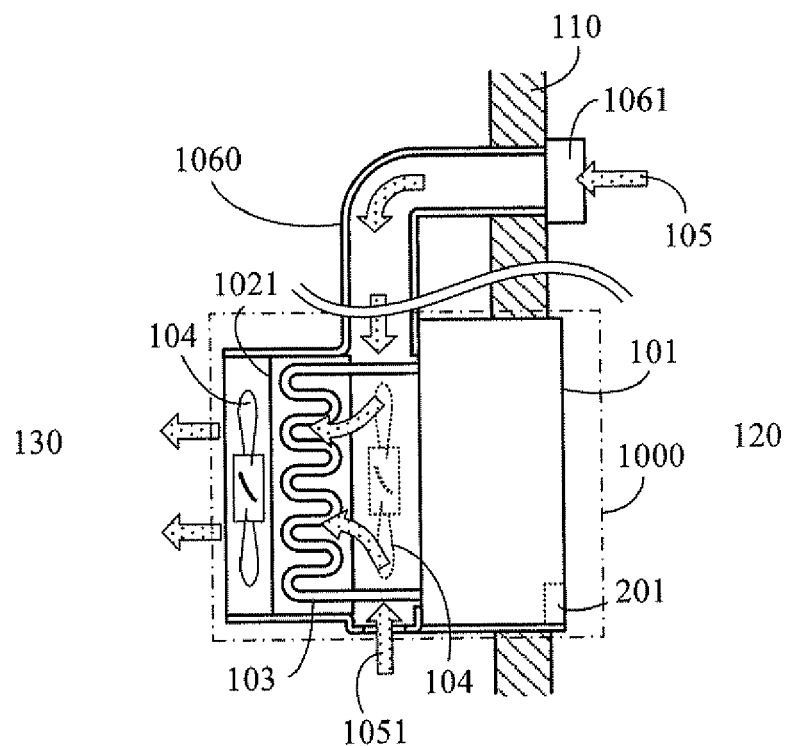
FIG. 4 is a structural schematic view of an embodiment of present invention having a fluid exhausting path (1060) and an external heat exchanger airflow exhausting fan unit (104) so as to pump an air conditioning object space exhausted fluid (105) and an external airflow (1051) to flow together through an external heat exchanger (1021) in the air conditioning device assembly (1000).

FIG. 4 is a structural schematic view of an embodiment of present invention having a fluid exhausting path (1060) and an external heat exchanger airflow exhausting fan unit (104) so as to pump an air conditioning object space exhausted fluid (105) and an external airflow (1051) to flow together through an external heat exchanger (1021) in the air conditioning device assembly (1000).

As illustrated in FIG. 4, the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (1060) and an exhaust amount regulating device (1061);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the fluid exhausting path (1060), enabling two airflows to exhaust to the external temperature differentiation space (130) through the external heat exchanger (1021);

whereby an air conditioning device assembly (1000) is formed by the abovementioned structures;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

Figure 5:
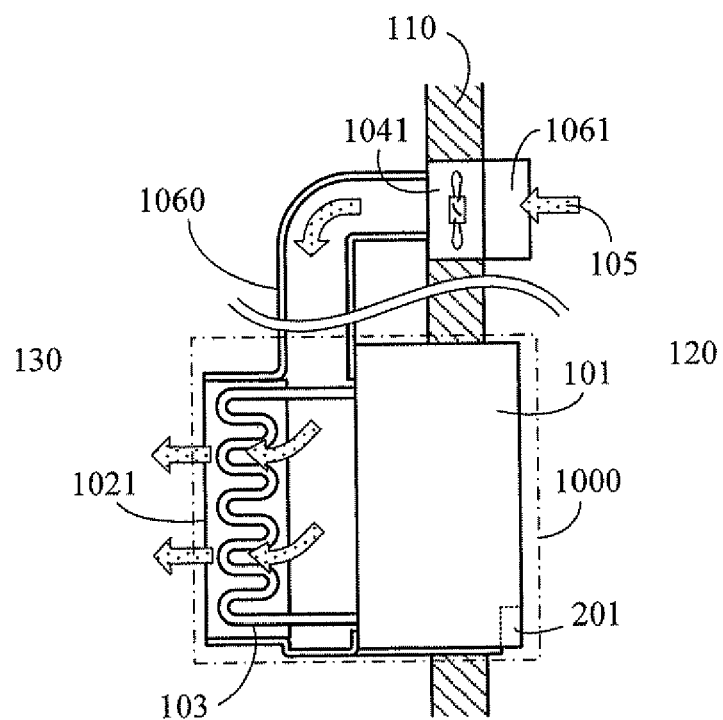
FIG. 5 is a structural schematic view of an embodiment of present invention having a separately mounted blowing pump (1041) and an exhaust amount regulating device (1061) and having an air conditioning device assembly (1000) without the external heat exchanger airflow exhausting fan unit (104).

FIG. 5 is a structural schematic view of an embodiment of present invention having a separately mounted blowing pump (1041) and an exhaust amount regulating device (1061) and having an air conditioning device assembly (1000) without the external heat exchanger airflow exhausting fan unit (104).

As illustrated in FIG. 5, the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (1060), an exhaust amount regulating device (1061), a blowing pump (1041);

the external heat exchanger (1021), provided with the coolant fluid pipeline (103) for allowing the coolant passed from the main unit to heat exchange with the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

whereby an air conditioning device assembly (1000) is formed by the abovementioned structures;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

Figure 6:
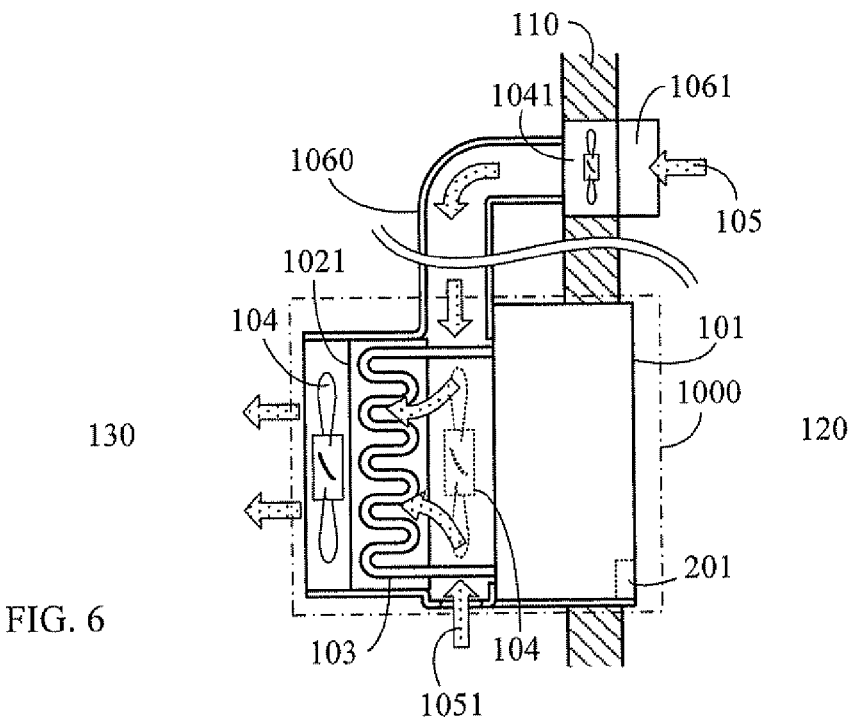
FIG. 6 is a structural schematic view of an embodiment of present invention having an integral air conditioning device assembly (1000) mounted with an external heat exchanger airflow exhausting fan unit (104) and the fluid exhausting path (1060) and the blowing pump (1041).

FIG. 6 is a structural schematic view of an embodiment of present invention having an air conditioning device assembly (1000) mounted with an external heat exchanger airflow exhausting fan unit (104) and the fluid exhausting path (1060) and the blowing pump (1041).

As illustrated in FIG. 6, the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (1060) and a blowing pump (1041);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the fluid exhausting path (1060) by the blowing pump (1041), enabling two airflows to exhaust to the external temperature differentiation space (130) through the external heat exchanger (1021);

whereby an air conditioning device assembly (1000) is formed by the abovementioned structures;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the fluid exhausting path (1060), so as to exhaust to the external temperature differentiation space (130) through the external heat exchanger (1021), enabling two airflows to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

Figure 7:
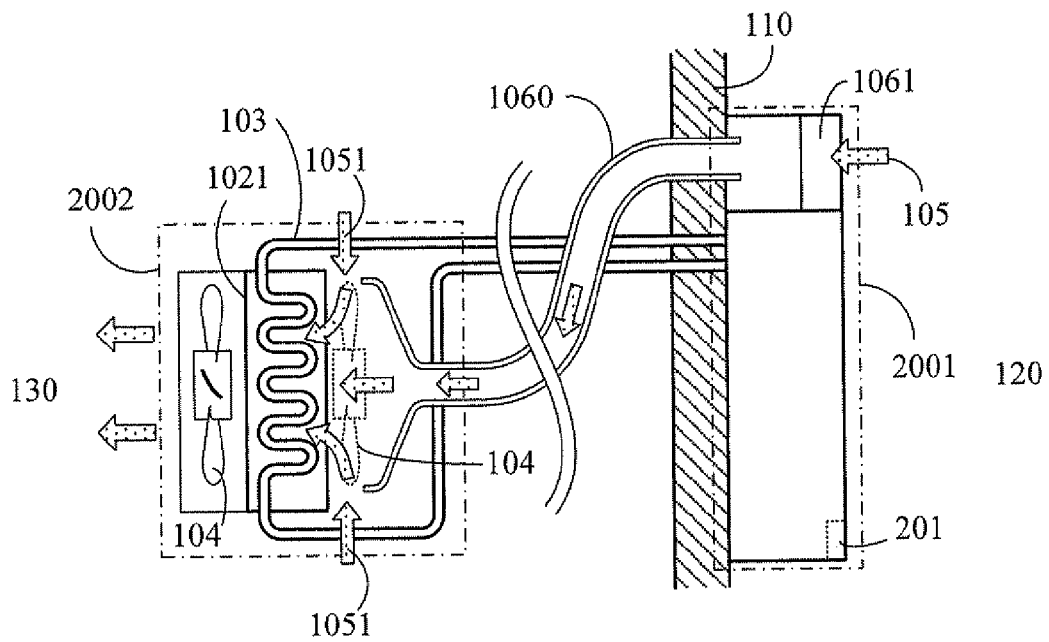
FIG. 7 is a structural schematic view of an embodiment of present invention having a split type air conditioning device outdoor unit (2002) with an external heat exchanger airflow exhausting fan unit (104) and a split type air conditioning device main unit (2001) mounted with the fluid exhausting path (1060).

FIG. 7 is a structural schematic view of an embodiment of present invention having a split type air conditioning device outdoor unit (2002) with an external heat exchanger airflow exhausting fan unit (104) and a split type air conditioning device main unit (2001) mounted with the fluid exhausting path (1060).

As illustrated in FIG. 7, the main configurations are as follows:

a split type air conditioning device main unit (2001), essentially consisted of a throttle device, an internal heat exchanger (203), a compression device, pipelines, a control device (201), an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a fluid exhausting path (1060) and an exhaust amount regulating device (1061);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the fluid exhausting path (1060), and enabling two airflows to exhaust to the external temperature differentiation space (130) through the external heat exchanger (1021);

the coolant fluid pipeline (103), which is a circulation pipeline device for coupling the air conditioning device main unit (101) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

Figure 8:
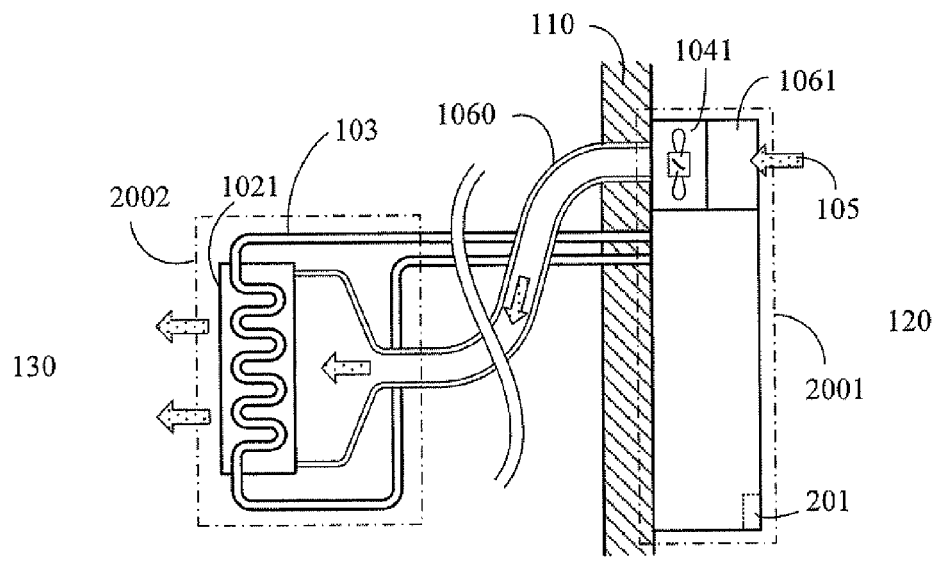
FIG. 8 is a structural schematic view of an embodiment of present invention having the split type air conditioning device main unit (2001) commonly constructed with the blowing pump (1041) and having a split type air conditioning device outdoor unit (2002) without the external heat exchanger airflow exhausting fan unit (104).

FIG. 8 is a structural schematic view of an embodiment of present invention having the split type air conditioning device main unit (2001) commonly constructed with the blowing pump (1041) and having a split type air conditioning device outdoor unit (2002) without the external heat exchanger airflow exhausting fan unit (104).

As illustrated in FIG. 8, the main configurations are as follows:

a split type air conditioning device main unit (2001), essentially consisted of a throttle device, an internal heat exchanger (203), a compression device, pipelines, a control device (201), an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a fluid exhausting path (1060), an exhaust amount regulating device (1061) and a blowing pump (1041);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the air conditioning object space exhausted fluid (105) by means of the external heat exchanger (1021);

the coolant fluid pipeline (103), which is a circulation pipeline device for coupling the air conditioning device main unit (101) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation which is pumped from the air conditioning object space (120) through the exhaust amount regulating device (1061) and the fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

Figure 9:
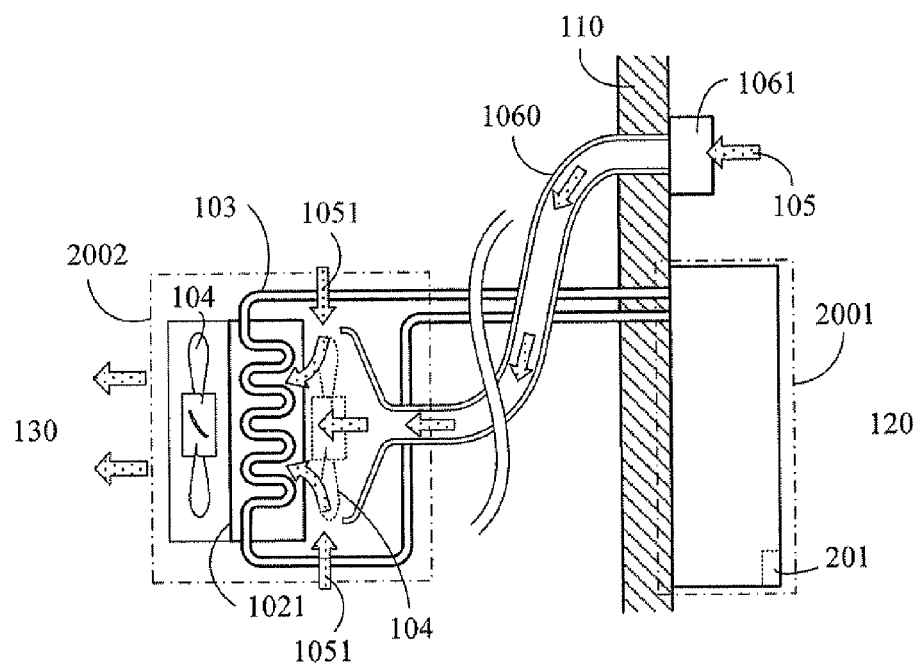
FIG. 9 is a structural schematic view of an embodiment of present invention having the separately mounted fluid exhausting path (1060), the split type air conditioning device main unit (2001) and the split type air conditioning device outdoor unit (2002) with the external heat exchanger airflow exhausting fan unit (104).

FIG. 9 is a structural schematic view of an embodiment of present invention having the separately mounted fluid exhausting path (1060), the split type air conditioning device main unit (2001) and the split type air conditioning device outdoor unit (2002) with the external heat exchanger airflow exhausting fan unit (104).

As illustrated in FIG. 9, the main configurations are as follows:

a split type air conditioning device main unit (2001), essentially consisted of a throttle device, an internal heat exchanger (203), a compression device, pipelines, a control device (201), an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a fluid exhausting path (1060) and an exhaust amount regulating device (1061);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the fluid exhausting path (1060), enabling two airflows to exhaust to the external temperature differentiation space (130) through the external heat exchanger (1021);

the coolant fluid pipeline (103), which is a circulation pipeline device for coupling the split type air conditioning device main unit (2001) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

Figure 10:
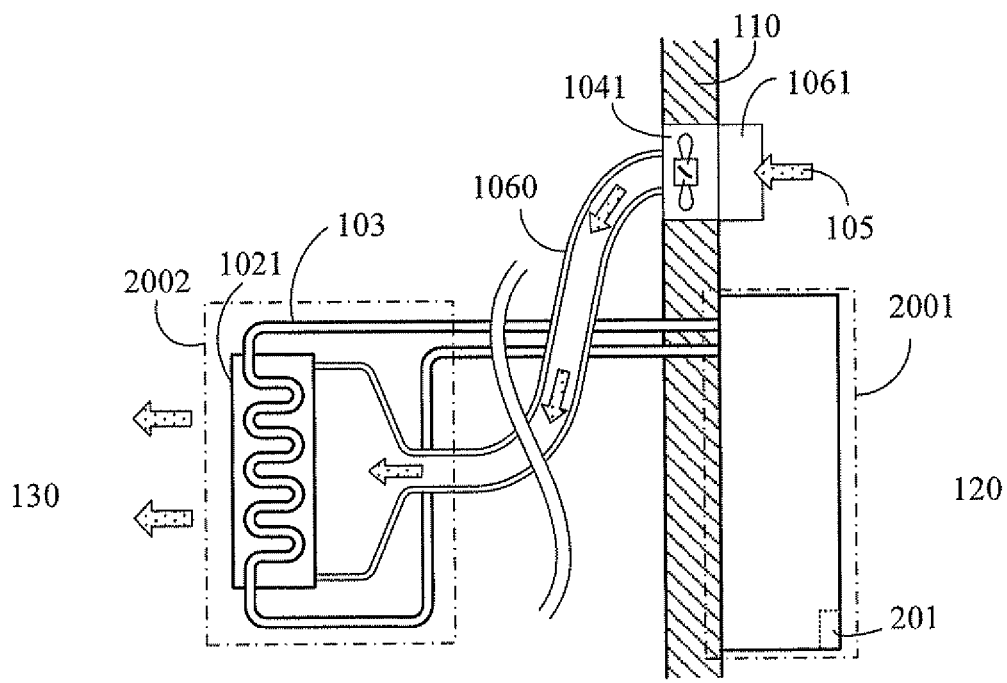
FIG. 10 is a structural schematic view of an embodiment of present invention having the separately mounted blowing pump (1041), the split type air conditioning device main unit (2001) and the split type air conditioning device outdoor unit (2002) without the external heat exchanger airflow exhausting fan unit (104).

FIG. 10 is a structural schematic view of an embodiment of present invention having the separately mounted blowing pump (1041), the split type air conditioning device main unit (2001) and the split type air conditioning device outdoor unit (2002) without the external heat exchanger airflow exhausting fan unit (104).

Figure 11:
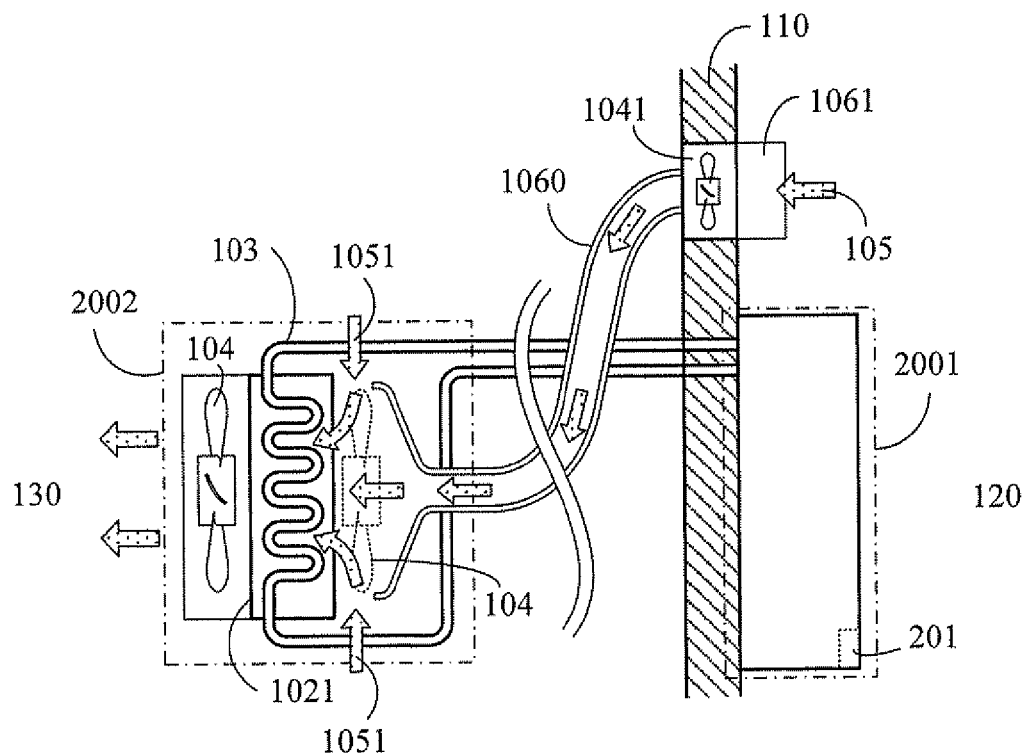
FIG. 11 is a structural schematic view of an embodiment of present invention having the split type air conditioning device main unit (2001), the split type air conditioning device outdoor unit (2002) with the external heat exchanger airflow exhausting fan unit (104) and the separately mounted blowing pump (1041).

As illustrated in FIG. 10, the main configurations are as follows:

a split type air conditioning device main unit (2001), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (1060), an exhaust amount regulating device (1061) and a blowing pump (1041);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the air conditioning object space exhausted fluid (105) by means of the external heat exchanger (1021);

the coolant fluid pipeline (103), which is a circulation pipeline device for coupling split type air conditioning device main unit (2001) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation which is pumped from the air conditioning object space (120) through the exhaust amount regulating device (1061) and the fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105);

FIG. 11 is a structural schematic view of an embodiment of present invention having the split type air conditioning device main unit (2001), the split type air conditioning device outdoor unit (2002) with the external heat exchanger airflow exhausting fan unit (104) and the separately mounted blowing pump (1041).

As illustrated in FIG. 11, the main configurations are as follows:

a split type air conditioning device main unit (2001), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (1060), the exhaust amount regulating device (1061) and the blowing pump (1041);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the fluid exhausting path (1060), enabling two airflows to exhaust to the external temperature differentiation space (130) through the external heat exchanger (1021);

the coolant fluid pipeline (103), which is a circulation pipeline device for coupling the split type air conditioning device main unit (2001) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

Figure 12:
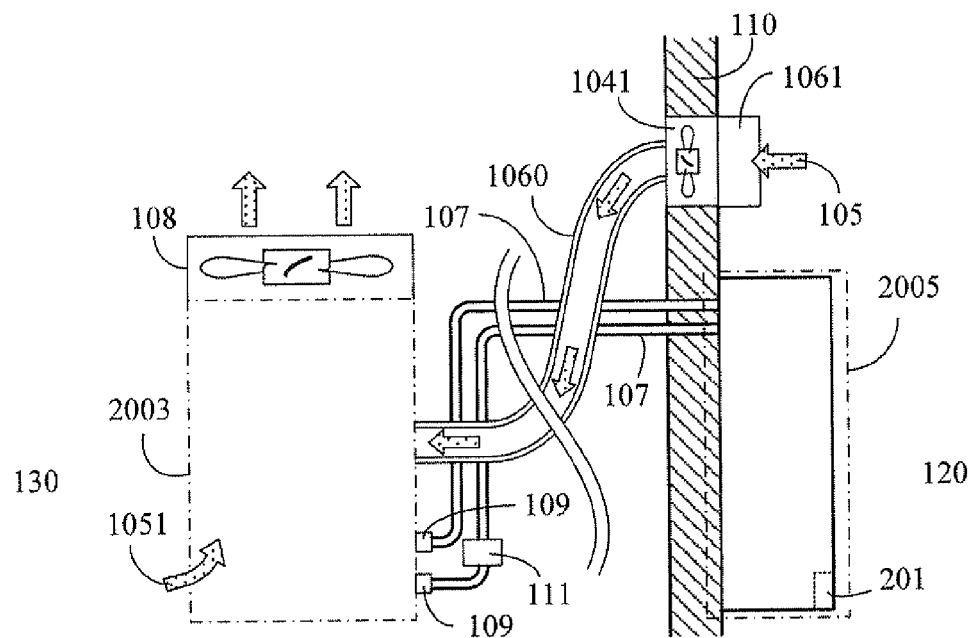
FIG. 12 is a structural schematic view of an embodiment of present invention having a water-cooled air conditioning device main unit (2005), a powered fan provided cooling tower (2003) and the separately mounted blowing pump (1041).

FIG. 12 is a structural schematic view of an embodiment of present invention having a water-cooled air conditioning device main unit (2005), a powered fan provided cooling tower (2003) and the separately mounted blowing pump (1041).

As illustrated in FIG. 12, the main configurations are as follows:

a water-cooled air conditioning device main unit (2005), which is an air conditioning device main unit essentially consisted of a throttle device, an internal heat exchanger (203), a compression device, pipelines, a control device (201), an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of the powered fan provided cooling tower (2003) disposed in the external temperature differentiation space (130) so as to form a path of water circulation; and having the fluid exhausting path (1060), the exhaust amount regulating device (1061) and the blowing pump (1041), and by means of the blowing pump (1041) to pump the air conditioning object space exhausted fluid (105) through the fluid exhausting path (1060) and the exhaust amount regulating device (1061) to an air inlet of the powered fan provided cooling tower (2003);

the powered fan provided cooling tower (2003), comprising a cooling tower equipped with the cooling tower fan unit (108), for example, a counterflow mechanical draft cooling tower, an induced counterflow mechanical draft cooling tower, a counterflow cooling tower, a crossflow mechanical draft cooling tower, or an evaporative cooling tower, and the powered fan provided cooling tower (2003) having an air inlet, so that the air conditioning object space exhausted fluid (105) pumped from the air conditioning object space (120) through the blowing pump (1041) is directed through the fluid exhausting path (1060) into the air inlet of the powered fan provided cooling tower (2003), and passing through the powered fan provided cooling tower (2003) so as to cool the waterflow and then is exhausted to the surrounding through the cooling tower fan unit (108), and having a water in and out pipe (109) for connecting the water pipe (107) so as to allow the cooling water to circulate between the powered fan provided cooling tower (2003) and the water-cooled air conditioning device main unit (2005);

the water pipe (107), disposed between a water-cooled condensing device of the water-cooled air conditioning device main unit (2005) and the water in and out pipe (109) of the powered fan provided cooling tower (2003);

the cooling tower fan unit (108), comprising an air blowing or exhausting fan unit or an air pump driven by an electric motor, and having one or more following operation functions, including: 1) pumping the external airflow (1051) of the external temperature differentiation space (130) to the external temperature differentiation space (130) through the inside of the powered fan provided cooling tower (2003); 2) pumping the air conditioning object space exhausted fluid (105) with a temperature differentiation from the air conditioning object space (120) through the exhaust amount regulating device (1061), the blowing pump (1041) and the fluid exhausting path (1060) to the external temperature differentiation space (130) through the powered fan provided cooling tower (2003); 3) enabling the external airflow (1051) and the air conditioning object space exhausted fluid (105) to exhaust commonly to the external temperature differentiation space (130) through the powered fan provided cooling tower (2003);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

Figure 13:
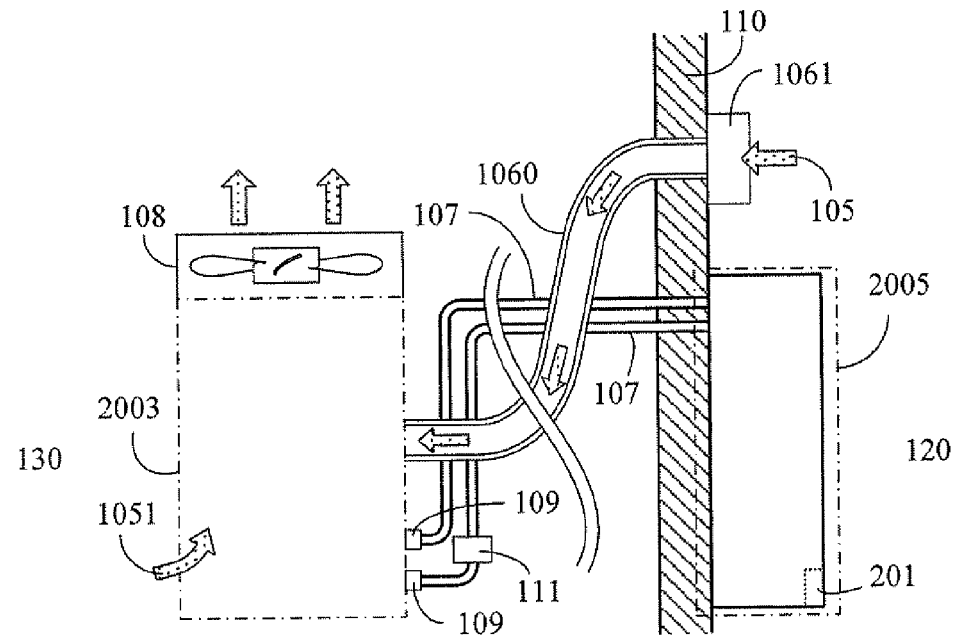
FIG. 13 is a structural schematic view of an embodiment of present invention having a water-cooled air conditioning device main unit (2005) and a powered fan provided cooling tower (2003).

FIG. 13 is a structural schematic view of an embodiment of present invention having a water-cooled air conditioning device main unit (2005) and a powered fan provided cooling tower (2003).

As illustrated in FIG. 13, the main configurations are as follows:

a water-cooled air conditioning device main unit (2005), which is an air conditioning device main unit essentially consisted of a throttle device, an internal heat exchanger (203), a compression device, pipelines, a control device (201), an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of the powered fan provided cooling tower (2003) disposed in the external temperature differentiation space (130) so as to form a path of water circulation; and having a fluid exhausting path (1060) and an exhaust amount regulating device (1061) for delivering the air conditioning object space exhausted fluid (105) to an air inlet of the powered fan provided cooling tower (2003);

the powered fan provided cooling tower (2003), comprising a cooling tower equipped with the cooling tower fan unit (108), for example, a counterflow mechanical draft cooling tower, an induced counterflow mechanical draft cooling tower, a counterflow cooling tower, a crossflow mechanical draft cooling tower, or an evaporative cooling tower, and the powered fan provided cooling tower (2003) having an air inlet, so that the air conditioning object space exhausted fluid (105) pumped from the air conditioning object space (120) is directed through the fluid exhausting path (1060) into the air inlet of the powered fan provided cooling tower (2003), and is passing through the powered fan provided cooling tower (2003) so as to cool the waterflow, and then is exhausted to the surrounding through the cooling tower fan unit (108), and having a water in and out pipe (109) for connecting the water pipe (107) so as to allow the cooling water to circulate between the powered fan provided cooling tower (2003) and the water-cooled air conditioning device main unit (2005);

the water pipe (107), disposed between a water-cooled condensing device of the water-cooled air conditioning device main unit (2005) and the water in and out pipe (109) of the powered fan provided cooling tower (2003);

the cooling tower fan unit (108), comprising an air blowing or exhausting fan unit or an air pump driven by an electric motor, and having one or more following operation functions, including: 1) pumping the external airflow (1051) of the external temperature differentiation space (130) to the external temperature differentiation space (130) through the inside of the powered fan provided cooling tower (2003); 2) pumping the air conditioning object space exhausted fluid (105) with a temperature differentiation from the air conditioning object space (120) through the exhaust amount regulating device (1061) and the fluid exhausting path (1060) to the external temperature differentiation space (130) through the powered fan provided cooling tower (2003); 3) enabling the external airflow (1051) and the air conditioning object space exhausted fluid (105) to exhaust commonly to the external temperature differentiation space (130) through the powered fan provided cooling tower (2003);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

Figure 14:
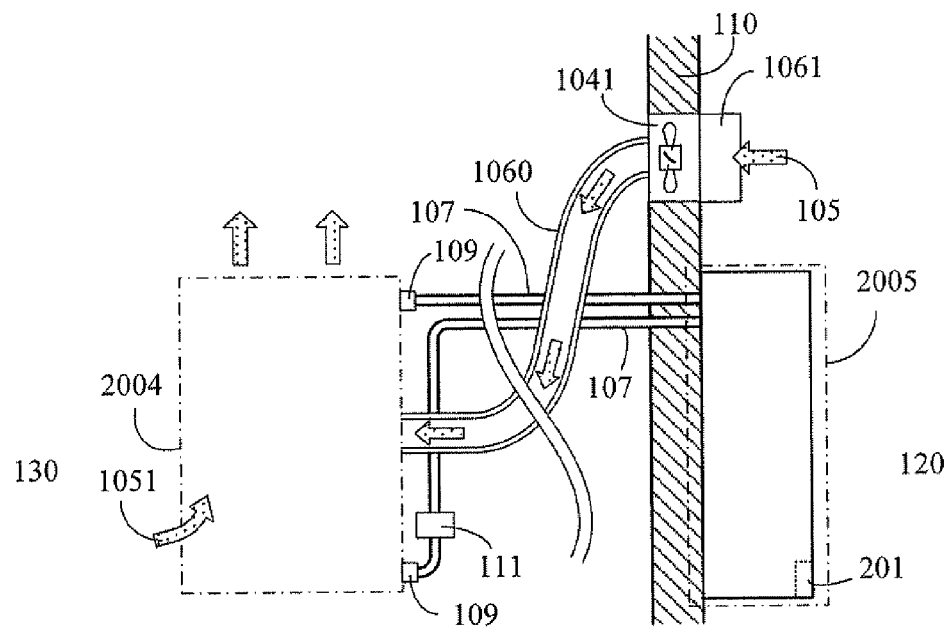
FIG. 14 is a structural schematic view of an embodiment of present invention having a water-cooled air conditioning device main unit (2005), a natural draft cooling tower (2003) and the separately mounted blowing pump (1041).

FIG. 14 is a structural schematic view of an embodiment of present invention having a water-cooled air conditioning device main unit (2005), a natural draft cooling tower (2003) and the separately mounted blowing pump (1041).

As illustrated in FIG. 14, the main configurations are as follows:

a water-cooled air conditioning device main unit (2005), which is an air conditioning device main unit essentially consisted of a throttle device, an internal heat exchanger (203), a compression device, pipelines, a control device (201), an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of a natural draft cooling tower (2004) disposed in the external temperature differentiation space (130) so as to form a path of water circulation; and having the fluid exhausting path (1060), the exhaust amount regulating device (1061) and the blowing pump (1041), and by means of the blowing pump (1041) to pump the air conditioning object space exhausted fluid (105) to an air inlet of the natural draft cooling tower (2004) through the fluid exhausting path (1060) and the exhaust amount regulating device (1061);

a natural draft cooling tower (2004), comprising a natural draft cooling tower, for example, a crossflow natural draft cooling tower, and the natural draft cooling tower (2004) having an air inlet, and having one or more following operating functions, including: 1) directing the external airflow (1051) from the external temperature differentiation space (130) into the air inlet of the natural draft cooling tower (2004), and passing through the natural draft cooling tower (2004) so as to cool the waterflow, and then exhausting the same to the surrounding through the cooling tower; 2) directing the air conditioning object space exhausted fluid (105) pumped from the air conditioning object space (120) by means of the blowing pump (1041) through the fluid exhausting path (1060) into the air inlet of the natural draft cooling tower (2004), and passing through the natural draft cooling tower (2004) so as to cool the waterflow, and then exhausting the same to the surrounding through the cooling tower; 3) directing the air conditioning object space exhausted fluid (105) and the external airflow (1051) into the air inlet of the natural draft cooling tower (2004), and passing through the natural draft cooling tower (2004) so as to cool the waterflow, and then exhausting the same to the surrounding through the cooling tower; and having a water in and out pipe (109) for coupling the water pipe (107) so as to allow the cooling water to circulate between the natural draft cooling tower (2004) and the water-cooled air conditioning device main unit (2005);

the water pipe (107), disposed between a water-cooled condensing device of the water-cooled air conditioning device main unit (2005) and the water in and out pipe (109) of the natural draft cooling tower (2004);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

Figure 15:
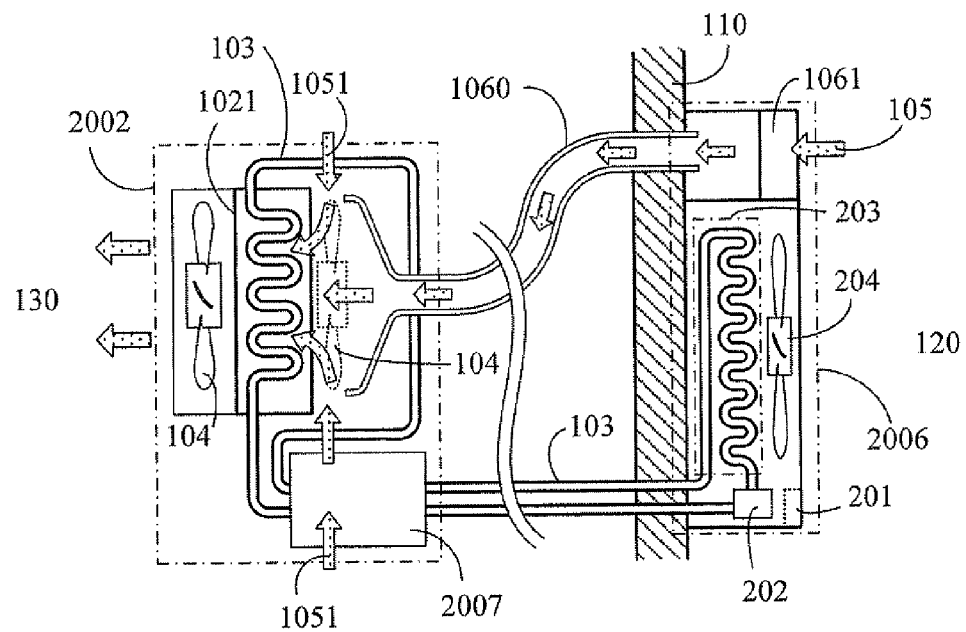
FIG. 15 is a structural schematic view of an embodiment of present invention having a split type air conditioning device outdoor unit (2002) composed of an external heat exchanger (1021) and an airflow exhausting fan unit (104) and a split type air conditioning device outdoor main station (2007), having a split type air conditioning device indoor unit (2006) composed of an internal heat exchanger (203), an flow regulating device (202), a control device (201), a conditioned airflow blowing fan (204) and an exhaust amount regulating device (1061), having a coolant compressing and circulating loop constructed by a coolant fluid pipeline (103) installed between the above two, and installing a fluid exhausting path (1060) and introducing external airflow (1051) in the air conditioning object space (120) between the exhaust amount regulating device (1061) and the external heat exchanger (1021).

The air conditioning device utilizing temperature differentiation of exhausted gas to even temperature of external heat exchanger is further applied to a spilt type air conditioning device, which mainly includes a split type air conditioning device outdoor unit (2002) therein having a split type air conditioning device outdoor main station (2007) and an external heat exchanger (1021) and an airflow exhausting fan unit (104), and a split type air conditioning device indoor unit (2006) therein having an internal heat exchanger (203), a flow regulating device (202), a conditioned airflow blowing fan (204) and a control device (201), and a coolant compressing and circulating loop constructed by a coolant fluid pipeline (103) being installed therebetween, and a fluid exhausting path (1060) being installed from the air conditioning object space (120) to the external heat exchanger (1021) for facilitating the applications in various separated space, illustrated as followings:

FIG. 15 is a structural schematic view of an embodiment of present invention having a split type air conditioning device outdoor unit (2002) composed of an external heat exchanger (1021) and an airflow exhausting fan unit (104) and a split type air conditioning device outdoor main station (2007), having a split type air conditioning device indoor unit (2006) composed of an internal heat exchanger (203), an flow regulating device (202), a control device (201), a conditioned airflow blowing fan (204) and an exhaust amount regulating device (1061), having a coolant compressing and circulating loop constructed by a coolant fluid pipeline (103) installed between the above two, and installing a fluid exhausting path (1060) and introducing external airflow (1051) in the air conditioning object space (120) between the exhaust amount regulating device (1061) and the external heat exchanger (1021);

As shown FIG. 15, the main configuration is installing a split type air conditioning device outdoor unit (2002) composed of an external heat exchanger (1021) and an airflow exhausting fan unit (104) and a split type air conditioning device outdoor main station (2007), and installing a split type air conditioning device indoor unit (2006) composed of an internal heat exchanger (203), a flow regulating device (202), a control device (201), a conditioned airflow blowing fan (204) and an exhaust amount regulating device (1061), and forming a coolant compressing and circulating loop constructed by a coolant fluid pipeline (103) installed between the above two, and installing a fluid exhausting path (1060) and introducing external airflow (1051) in the air conditioning object space (120) between the exhaust amount regulating device (1061) and the external heat exchanger (1021); and wherein split type air conditioning device outdoor unit (2002), installed with the split type air conditioning device outdoor main station (2007), the external heat exchanger (1021), the coolant fluid pipeline (103) and the airflow exhausting fan unit (104), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device; the split type air conditioning device indoor unit (2006) is further installed with the exhaust amount regulating device (1061) and the fluid exhausting path (1060);

the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);

the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and fluid exhausting path (1060) can be individually installed or jointly constituted as a pipeline structure.

Figure 16:
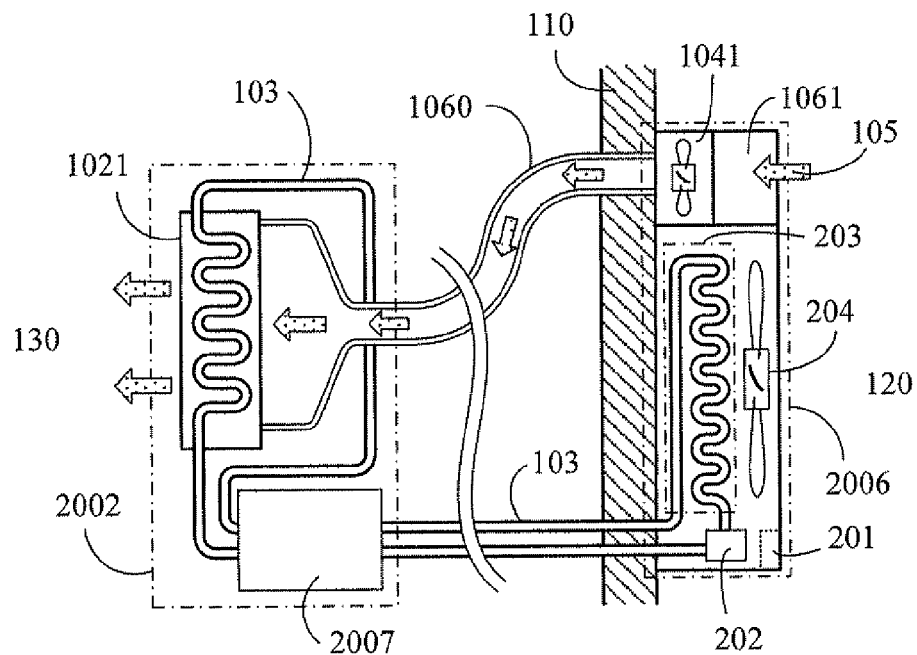
FIG. 16 is a structural schematic view of an embodiment of present invention having a split type air conditioning device outdoor unit (2002) composed of an external heat exchanger (1021) and a split type air conditioning device outdoor main station (2007), having a split type air conditioning device indoor unit (2006) composed of an internal heat exchanger (203), an flow regulating device (202), a control device (201), a conditioned airflow blowing fan (204), a blowing pump (1041) and an exhaust amount regulating device (1061), having a coolant compressing and circulating loop constructed by a coolant fluid pipeline (103) installed between the above two, and installing a fluid exhausting path (1060) in the air conditioning object space (120) between the exhaust amount regulating device (1061), the blowing pump (1041) and the external heat exchanger (1021).

FIG. 16 is a structural schematic view of an embodiment of present invention having a split type air conditioning device outdoor unit (2002) composed of an external heat exchanger (1021) and a split type air conditioning device outdoor main station (2007), having a split type air conditioning device indoor unit (2006) composed of an internal heat exchanger (203), an flow regulating device (202), a control device (201), a conditioned airflow blowing fan (204), a blowing pump (1041) and an exhaust amount regulating device (1061), having a coolant compressing and circulating loop constructed by a coolant fluid pipeline (103) installed between the above two, and installing a fluid exhausting path (1060) in the air conditioning object space (120) between the exhaust amount regulating device (1061), the blowing pump (1041) and the external heat exchanger (1021).

As shown FIG. 16, the main configuration is installing a split type air conditioning device outdoor unit (2002) composed of an external heat exchanger (1021) and a split type air conditioning device outdoor main station (2007), and installing a split type air conditioning device indoor unit (2006) composed of an internal heat exchanger (203), a flow regulating device (202), a control device (201), a conditioned airflow blowing fan (204), a blowing pump (1041) and an exhaust amount regulating device (1061), and forming a coolant compressing and circulating loop constructed by a coolant fluid pipeline (103) installed between the above two, and installing a fluid exhausting path (1060) in the air conditioning object space (120) between the exhaust amount regulating device (1061), the blowing pump (1041) and the external heat exchanger (1021); and wherein split type air conditioning device outdoor unit (2002), installed with the split type air conditioning device outdoor main station (2007), the external heat exchanger (1021) and the coolant fluid pipeline (103), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device; the split type air conditioning device indoor unit (2006) is further installed with the exhaust amount regulating device (1061), the blowing pump (1041) and the fluid exhausting path (1060);

the external heat exchanger (1021) of the split type air conditioning device outdoor unit (2002) is installed with the coolant fluid pipeline (103) allowing the coolant to flow through so as to exchange heat with the air conditioning object space exhausted fluid (105);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

Figure 17:
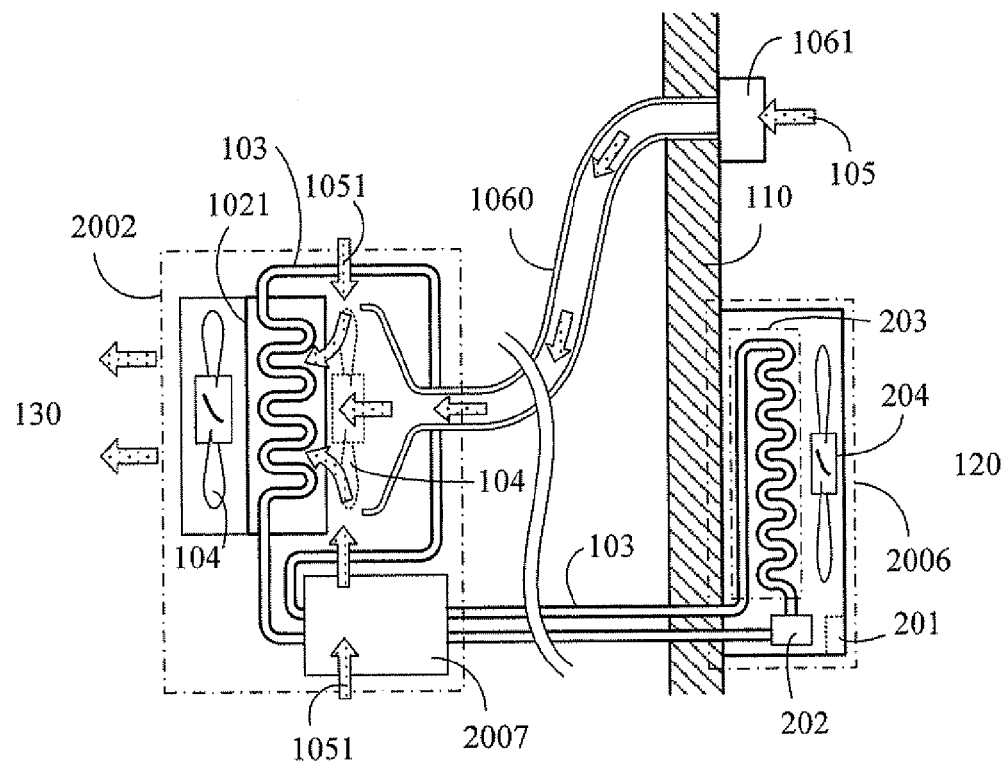
FIG. 17 is a structural schematic view of an embodiment of present invention having a split type air conditioning device outdoor unit (2002) composed of an external heat exchanger (1021) and an airflow exhausting fan unit (104) and a split type air conditioning device outdoor main station (2007), having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above two, and separately mounting a exhaust amount regulating device (1061) in the thermal insulation device (110), and installing a fluid exhausting path (1060) and introducing external airflow (1051) in the air conditioning object space (120) between the exhaust amount regulating device (1061) and the external heat exchanger (1021).

FIG. 17 is a structural schematic view of an embodiment of present invention having a split type air conditioning device outdoor unit (2002) composed of an external heat exchanger (1021) and an airflow exhausting fan unit (104) and a split type air conditioning device outdoor main station (2007), having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above two, and separately mounting a exhaust amount regulating device (1061) in the thermal insulation device (110), and installing a fluid exhausting path (1060) and introducing external airflow (1051) in the air conditioning object space (120) between the exhaust amount regulating device (1061) and the external heat exchanger (1021).

As shown in FIG. 17, the main configuration is installing a split type air conditioning device outdoor unit (2002) composed of an external heat exchanger (1021) and an airflow exhausting fan unit (104) and a split type air conditioning device outdoor main station (2007), installing a split type air conditioning device indoor unit (2006) composed of an internal heat exchanger (203), an flow regulating device (202), a control device (201) and a conditioned airflow blowing fan (204), forming a coolant compressing and circulating loop constructed by a coolant fluid pipeline (103) installed between the above two, and separately mounting a exhaust amount regulating device (1061) in the thermal insulation device (110), and installing a fluid exhausting path (1060) and introducing external airflow (1051) in the air conditioning object space (120) between the exhaust amount regulating device (1061) and the external heat exchanger (1021); wherein split type air conditioning device outdoor unit (2002), installed with the split type air conditioning device outdoor main station (2007), the external heat exchanger (1021), the coolant fluid pipeline (103) and the airflow exhausting fan unit (104), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;

the thermal insulation device (110) is separately mounted with the exhaust amount regulating device (1061) and the fluid exhausting path (1060);

the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);

the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

Figure 18:
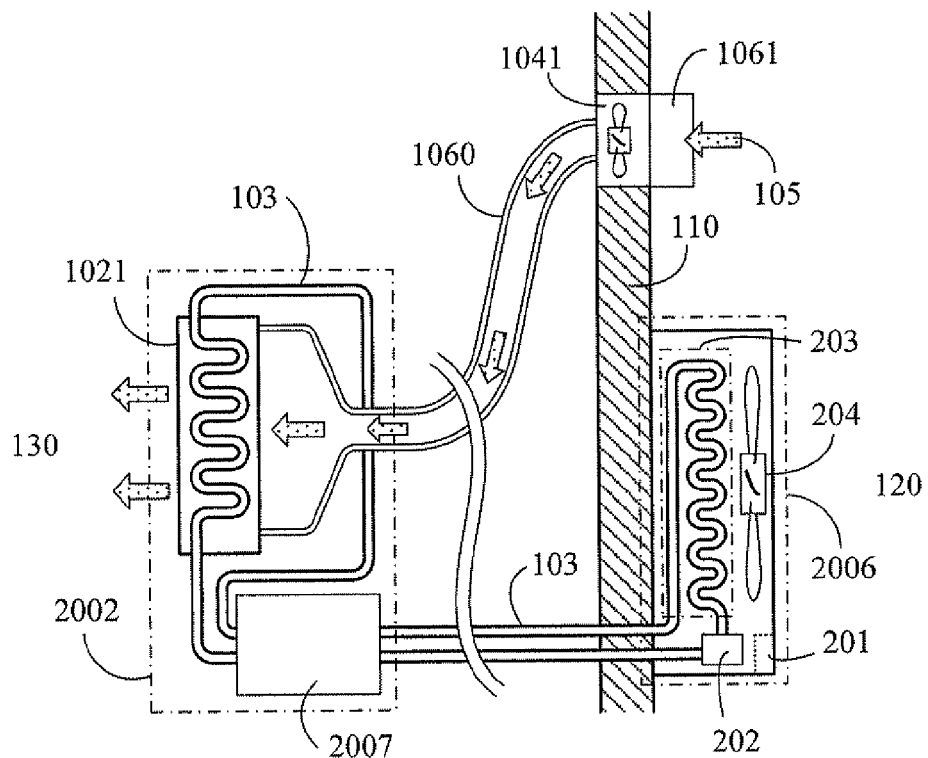
FIG. 18 is a structural schematic view of an embodiment of present invention having a split type air conditioning device outdoor unit (2002) composed of an external heat exchanger (1021) and a split type air conditioning device outdoor main station (2007), having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above two, and separately mounting a blowing pump (1041) and a exhaust amount regulating device (1061) in the thermal insulation device (110), and installing a fluid exhausting path (1060) in the air conditioning object space (120) between the exhaust amount regulating device (1061), the blowing pump (1041) and the external heat exchanger (1021).

FIG. 18 is a structural schematic view of an embodiment of present invention having a split type air conditioning device outdoor unit (2002) composed of an external heat exchanger (1021) and a split type air conditioning device outdoor main station (2007), having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above two, and separately mounting a blowing pump (1041) and a exhaust amount regulating device (1061) in the thermal insulation device (110), and installing a fluid exhausting path (1060) in the air conditioning object space (120) between the exhaust amount regulating device (1061), the blowing pump (1041) and the external heat exchanger (1021).

As shown in FIG. 18, the main configuration is installing a split type air conditioning device outdoor unit (2002) composed of an external heat exchanger (1021) and a split type air conditioning device outdoor main station (2007), and installing a split type air conditioning device indoor unit (2006) composed of an internal heat exchanger (203), a flow regulating device (202), a control device (201), a conditioned airflow blowing fan (204), and forming a coolant compressing and circulating loop constructed by a coolant fluid pipeline (103) installed between the above two, and separately mounting a blowing pump (1041) and a exhaust amount regulating device (1061) in the thermal insulation device (110), and installing a fluid exhausting path (1060) in the air conditioning object space (120) between the exhaust amount regulating device (1061), the blowing pump (1041) and the external heat exchanger (1021); wherein split type air conditioning device outdoor unit (2002), installed with the split type air conditioning device outdoor main station (2007), the external heat exchanger (1021) and the coolant fluid pipeline (103), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;

The thermal insulation device (110) is separately mounted with the exhaust amount regulating device (1061), the blowing pump (1041) and the fluid exhausting path (1060);

the external heat exchanger (1021) of the split type air conditioning device outdoor unit (2002) is installed with the coolant fluid pipeline (103) allowing the coolant to flow through so as to exchange heat with the air conditioning object space exhausted fluid (105);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

blowing pump (1041), constituted by an air blowing or air exhausting fan unit or an air pump driven by an electric motor, for pumping the air conditioning object space exhausted fluid (105) with a relative temperature differentiation from the air conditioning object space (120) through the exhaust amount regulating device (1061) and the fluid exhausting path (1060) and exchanging heat while flowing through the external heat exchanger (1021) then being exhausted to the external temperature differentiation space (130);

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

Figure 19:
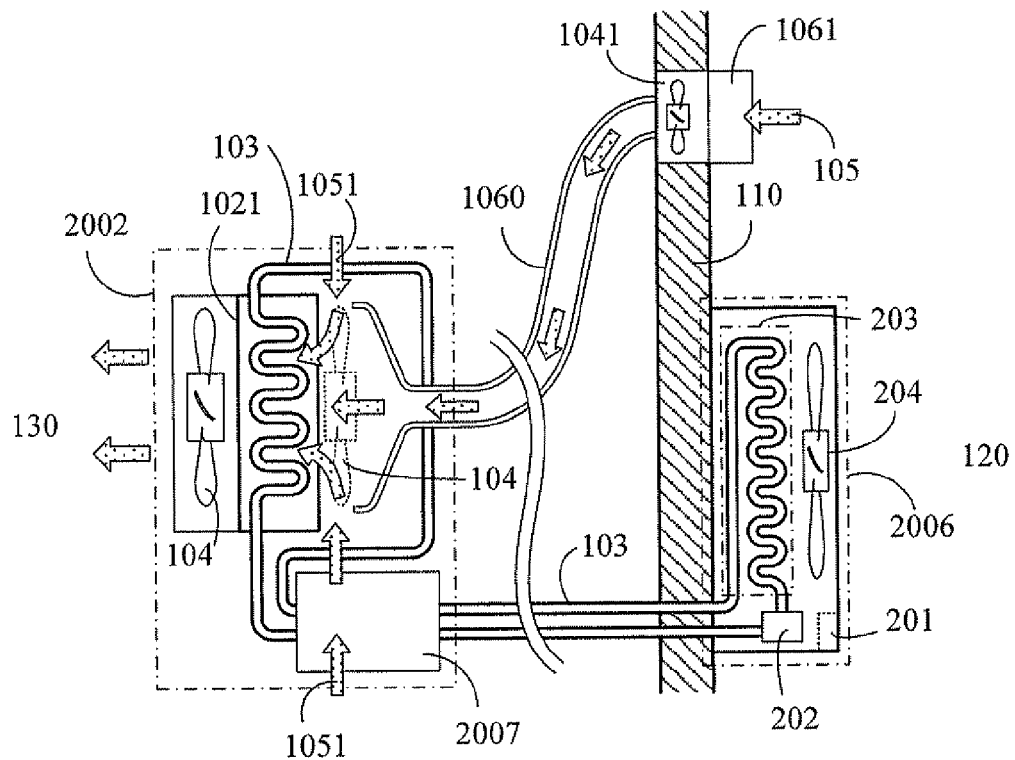
FIG. 19 is a structural schematic view of an embodiment of present invention having a split type air conditioning device outdoor unit (2002) composed of an external heat exchanger (1021) and an airflow exhausting fan unit (104) and a split type air conditioning device outdoor main station (2007), having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above two, and separately mounting a blowing pump (1041) and a exhaust amount regulating device (1061) in the thermal insulation device (110), and installing a fluid exhausting path (1060) and introducing external airflow (1051) in the air conditioning object space (120) between the exhaust amount regulating device (1061), the blowing pump (1041) and the external heat exchanger (1021).

FIG. 19 is a structural schematic view of an embodiment of present invention having a split type air conditioning device outdoor unit (2002) composed of an external heat exchanger (1021) and an airflow exhausting fan unit (104) and a split type air conditioning device outdoor main station (2007), having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above two, and separately mounting a blowing pump (1041) and a exhaust amount regulating device (1061) in the thermal insulation device (110), and installing a fluid exhausting path (1060) and introducing external airflow (1051) in the air conditioning object space (120) between the exhaust amount regulating device (1061), the blowing pump (1041) and the external heat exchanger (1021).

As shown in FIG. 19, the main configuration is installing a split type air conditioning device outdoor unit (2002) composed of an external heat exchanger (1021) and an airflow exhausting fan unit (104) and a split type air conditioning device outdoor main station (2007), installing a split type air conditioning device indoor unit (2006) composed of an internal heat exchanger (203), an flow regulating device (202), a control device (201) and a conditioned airflow blowing fan (204), forming a coolant compressing and circulating loop constructed by a coolant fluid pipeline (103) installed between the above two, and separately mounting a blowing pump (1041) and a exhaust amount regulating device (1061) in the thermal insulation device (110), and installing a fluid exhausting path (1060) and introducing external airflow (1051) in the air conditioning object space (120) between the exhaust amount regulating device (1061), the blowing pump (1041) and the external heat exchanger (1021); wherein split type air conditioning device outdoor unit (2002), installed with the split type air conditioning device outdoor main station (2007), the external heat exchanger (1021), the coolant fluid pipeline (103) and the airflow exhausting fan unit (104), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;

the thermal insulation device (110) is separately mounted with the exhaust amount regulating device (1061), the blowing pump (1041) and the fluid exhausting path (1060);

the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);

the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

Figure 20:
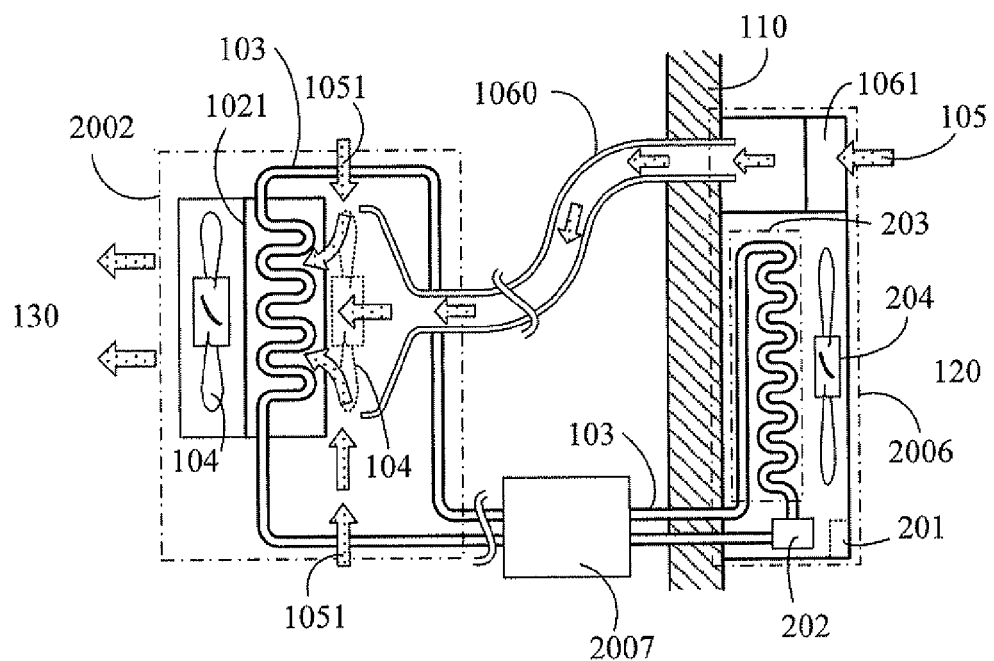
FIG. 20 is a structural schematic view of an embodiment of present invention having a split type air conditioning device outdoor unit (2002) composed of an external heat exchanger (1021) and an airflow exhausting fan unit (104), having a split type air conditioning device outdoor main station (2007) which is individually installed, having a split type air conditioning device indoor unit (2006) composed of an internal heat exchanger (203), an flow regulating device (202), a control device (201), a conditioned airflow blowing fan (204) and an exhaust amount regulating device (1061), having a coolant compressing and circulating loop constructed by a coolant fluid pipeline (103) installed between the above three, and installing a fluid exhausting path (1060) and introducing external airflow (1051) in the air conditioning object space (120) between the exhaust amount regulating device (1061) and the external heat exchanger (1021).

FIG. 20 is a structural schematic view of an embodiment of present invention having a split type air conditioning device outdoor unit (2002) composed of an external heat exchanger (1021) and an airflow exhausting fan unit (10), having a split type air conditioning device outdoor main station (2007) which is individually installed, having a split type air conditioning device indoor unit (2006) composed of an internal heat exchanger (203), an flow regulating device (202), a control device (201), a conditioned airflow blowing fan (204) and an exhaust amount regulating device (1061), having a coolant compressing and circulating loop constructed by a coolant fluid pipeline (103) installed between the above three, and installing a fluid exhausting path (1060) and introducing external airflow (1051) in the air conditioning object space (120) between the exhaust amount regulating device (1061) and the external heat exchanger (1021).

As shown in FIG. 20, the main configuration is installing a split type air conditioning device outdoor unit (2002) composed of an external heat exchanger (1021) and an airflow exhausting fan unit (104), installing a split type air conditioning device outdoor main station (2007) which is individually installed, and installing a split type air conditioning device indoor unit (2006) composed of an internal heat exchanger (203), a flow regulating device (202), a control device (201), a conditioned airflow blowing fan (204) and an exhaust amount regulating device (1061), and forming a coolant compressing and circulating loop constructed by a coolant fluid pipeline (103) installed between the above three, and installing a fluid exhausting path (1060) and introducing external airflow (1051) in the air conditioning object space (120) between the exhaust amount regulating device (1061) and the external heat exchanger (1021); wherein split type air conditioning device outdoor unit (2002), installed with the external heat exchanger (1021), the coolant fluid pipeline (103), the airflow exhausting fan unit (104) and the individually installed split type air conditioning device outdoor main station (2007), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device; the split type air conditioning device indoor unit (2006) is further installed with the exhaust amount regulating device (1061) and the fluid exhausting path (1060);

the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);

the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);

coolant fluid pipeline (103), constituted by a pipeline device for connecting the split type air conditioning device outdoor main station (2007) which is individually installed and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

Figure 21:
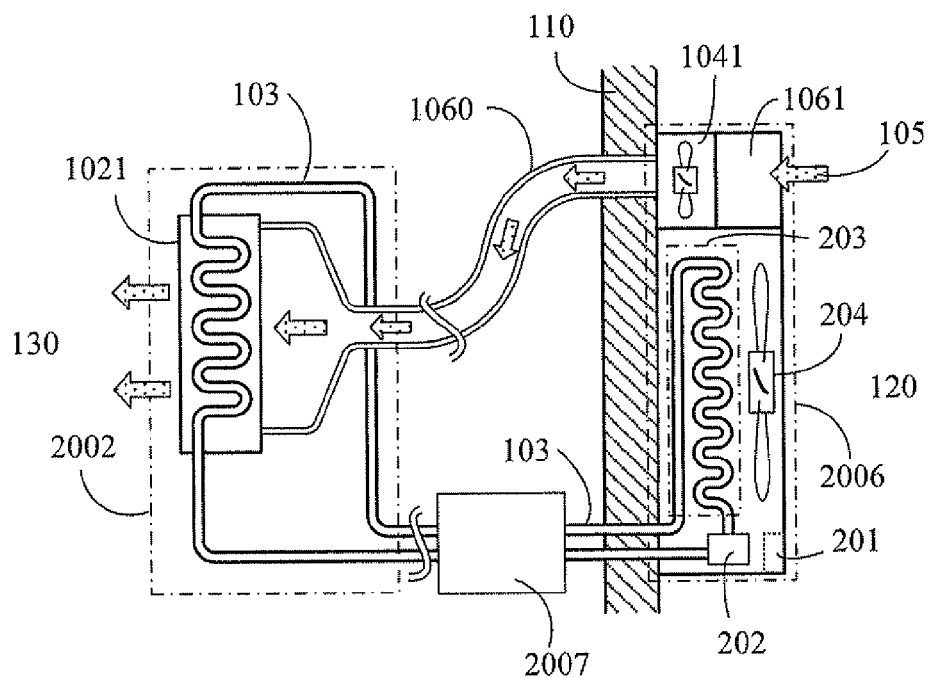
FIG. 21 is a structural schematic view of an embodiment of present invention having a split type air conditioning device outdoor unit (2002) composed of an external heat exchanger (1021), having a split type air conditioning device outdoor main station (2007) which is individually installed, having a split type air conditioning device indoor unit (2006) composed of an internal heat exchanger (203), an flow regulating device (202), a control device (201), a conditioned airflow blowing fan (204), a blowing pump (1041) and an exhaust amount regulating device (1061), having a coolant compressing and circulating loop constructed by a coolant fluid pipeline (103) installed between the above three, and installing a fluid exhausting path (1060) in the air conditioning object space (120) between the exhaust amount regulating device (1061), the blowing pump (1041) and the external heat exchanger (1021).

FIG. 21 is a structural schematic view of an embodiment of present invention having a split type air conditioning device outdoor unit (2002) composed of an external heat exchanger (1021), having a split type air conditioning device outdoor main station (2007) which is individually installed, having a split type air conditioning device indoor unit (2006) composed of an internal heat exchanger (203), an flow regulating device (202), a control device (201), a conditioned airflow blowing fan (204), a blowing pump (1041) and an exhaust amount regulating device (1061), having a coolant compressing and circulating loop constructed by a coolant fluid pipeline (103) installed between the above three, and installing a fluid exhausting path (1060) in the air conditioning object space (120) between the exhaust amount regulating device (1061), the blowing pump (1041) and the external heat exchanger (1021).

As shown in FIG. 21, the main configuration is installing a split type air conditioning device outdoor unit (2002) composed of an external heat exchanger (1021), installing a split type air conditioning device outdoor main station (2007) which is individually installed, and installing a split type air conditioning device indoor unit (2006) composed of an internal heat exchanger (203), a flow regulating device (202), a control device (201), a conditioned airflow blowing fan (204), a blowing pump (1041) and an exhaust amount regulating device (1061), and forming a coolant compressing and circulating loop constructed by a coolant fluid pipeline (103) installed between the above three, and installing a fluid exhausting path (1060) in the air conditioning object space (120) between the exhaust amount regulating device (1061), the blowing pump (1041) and the external heat exchanger (1021); wherein split type air conditioning device outdoor unit (2002), installed with the external heat exchanger (1021), the coolant fluid pipeline (103) and the individually installed split type air conditioning device outdoor main station (2007), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device; the split type air conditioning device indoor unit (2006) is further installed with the exhaust amount regulating device (1061), the blowing pump (1041) and the fluid exhausting path (1060);

the external heat exchanger (1021) of the split type air conditioning device outdoor unit (2002) is installed with the coolant fluid pipeline (103) allowing the coolant to flow through so as to exchange heat with the air conditioning object space exhausted fluid (105);

coolant fluid pipeline (103), constituted by a pipeline device for connecting the split type air conditioning device outdoor main station (2007) which is individually installed and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

blowing pump (1041), constituted by an air blowing or air exhausting fan unit or an air pump driven by an electric motor, for pumping the air conditioning object space exhausted fluid (105) with a relative temperature differentiation from the air conditioning object space (120) through the exhaust amount regulating device (1061) and the fluid exhausting path (1060) and flowing through the external heat exchanger (1021) then being exhausted to the external temperature differentiation space (130);

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

Figure 22:
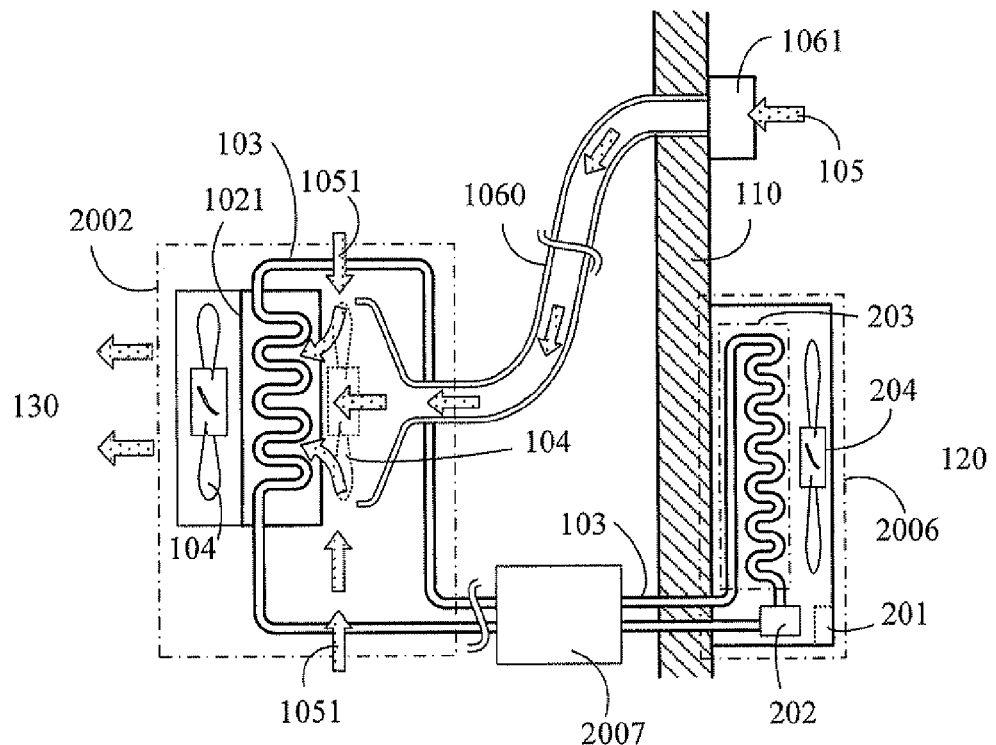
FIG. 22 is a structural schematic view of an embodiment of present invention having a split type air conditioning device outdoor unit (2002) composed of an external heat exchanger (1021) and an airflow exhausting fan unit (104), having a split type air conditioning device outdoor main station (2007) which is individually installed, having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above three, and separately mounting a exhaust amount regulating device (1061) in the thermal insulation device (110), and installing a fluid exhausting path (1060) and introducing external airflow (1051) in the air conditioning object space (120) between the exhaust amount regulating device (1061) and the external heat exchanger (1021).

FIG. 22 is a structural schematic view of an embodiment of present invention having a split type air conditioning device outdoor unit (2002) composed of an external heat exchanger (1021) and an airflow exhausting fan unit (104), having a split type air conditioning device outdoor main station (2007) which is individually installed, having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above three, and separately mounting a exhaust amount regulating device (1061) in the thermal insulation device (110), and installing a fluid exhausting path (1060) and introducing external airflow (1051) in the air conditioning object space (120) between the exhaust amount regulating device (1061) and the external heat exchanger (1021).

As shown in FIG. 22, the main configuration is installing a split type air conditioning device outdoor unit (2002) composed of an external heat exchanger (1021) and an airflow exhausting fan unit (104) installing a split type air conditioning device outdoor main station (2007) which is individually installed, and installing a split type air conditioning device indoor unit (2006) composed of an internal heat exchanger (203), a flow regulating device (202), a control device (201) and a conditioned airflow blowing fan (204), and forming a coolant compressing and circulating loop constructed by a coolant fluid pipeline (103) installed between the above three, and separately mounting a exhaust amount regulating device (1061) in the thermal insulation device (110), and installing a fluid exhausting path (1060) and introducing external airflow (1051) in the air conditioning object space (120) between the exhaust amount regulating device (1061) and the external heat exchanger (1021); wherein split type air conditioning device outdoor unit (2002), installed with the external heat exchanger (1021), the coolant fluid pipeline (103), the airflow exhausting fan unit (104) and the individually installed split type air conditioning device outdoor main station (2007), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;

the thermal insulation device (110) is separately mounted with the exhaust amount regulating device (1061) and the fluid exhausting path (1060);

the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);

the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);

coolant fluid pipeline (103), constituted by a pipeline device for connecting the split type air conditioning device outdoor main station (2007) which is individually installed and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

Figure 23:
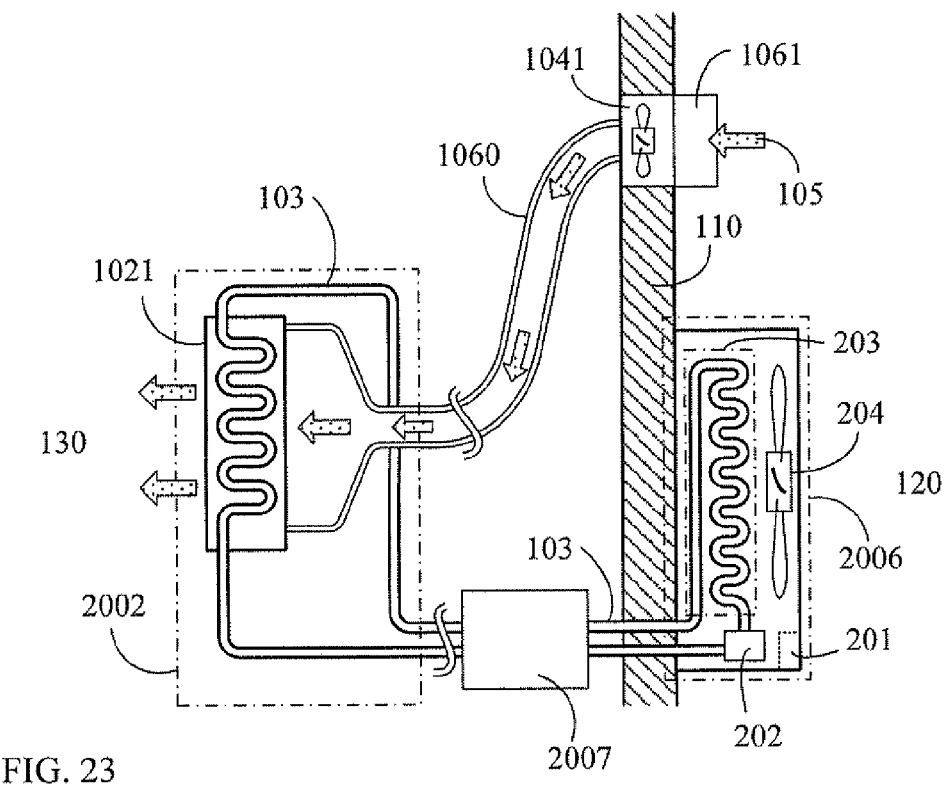
FIG. 23 is a structural schematic view of an embodiment of present invention having a split type air conditioning device outdoor unit (2002) composed of an external heat exchanger (1021), having a split type air conditioning device outdoor main station (2007) which is individually installed, having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above three, and separately mounting a blowing pump (1041) and a exhaust amount regulating device (1061) in the thermal insulation device (110), and installing a fluid exhausting path (1060) and introducing external airflow (1051) in the air conditioning object space (120) between the exhaust amount regulating device (1061), the blowing pump (1041) and the external heat exchanger (1021).

FIG. 23 is a structural schematic view of an embodiment of present invention having a split type air conditioning device outdoor unit (2002) composed of an external heat exchanger (1021), having a split type air conditioning device outdoor main station (2007) which is individually installed, having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above three, and separately mounting a blowing pump (1041) and a exhaust amount regulating device (1061) in the thermal insulation device (110), and installing a fluid exhausting path (1060) and introducing external airflow (1051) in the air conditioning object space (120) between the exhaust amount regulating device (1061), the blowing pump (1041) and the external heat exchanger (1021).

As shown in FIG. 23, the main configuration is installing a split type air conditioning device outdoor unit (2002) composed of an external heat exchanger (1021), installing a split type air conditioning device outdoor main station (2007) which is individually installed, and installing a split type air conditioning device indoor unit (2006) composed of an internal heat exchanger (203), a flow regulating device (202), a control device (201) and a conditioned airflow blowing fan (204), and forming a coolant compressing and circulating loop constructed by a coolant fluid pipeline (103) installed between the above three, and separately mounting a blowing pump (1041) and a exhaust amount regulating device (1061) in the thermal insulation device (110), and installing a fluid exhausting path (1060) in the air conditioning object space (120) between the exhaust amount regulating device (1061), the a blowing pump (1041) and the external heat exchanger (1021); wherein split type air conditioning device outdoor unit (2002), installed with the external heat exchanger (1021), the coolant fluid pipeline (103) and the individually installed split type air conditioning device outdoor main station (2007), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;

the thermal insulation device (110) is separately mounted with the exhaust amount regulating device (1061), the blowing pump (1041) and the fluid exhausting path (1060);

the external heat exchanger (1021) of the split type air conditioning device outdoor unit (2002) is installed with the coolant fluid pipeline (103) allowing the coolant to flow through so as to exchange heat with the air conditioning object space exhausted fluid (105);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

blowing pump (1041), constituted by an air blowing or air exhausting fan unit or an air pump driven by an electric motor, for pumping the air conditioning object space exhausted fluid (105) with a relative temperature differentiation from the air conditioning object space (120) through the exhaust amount regulating device (1061) and the fluid exhausting path (1060) and flowing through the external heat exchanger (1021) then being exhausted to the external temperature differentiation space (130);

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

Figure 24:
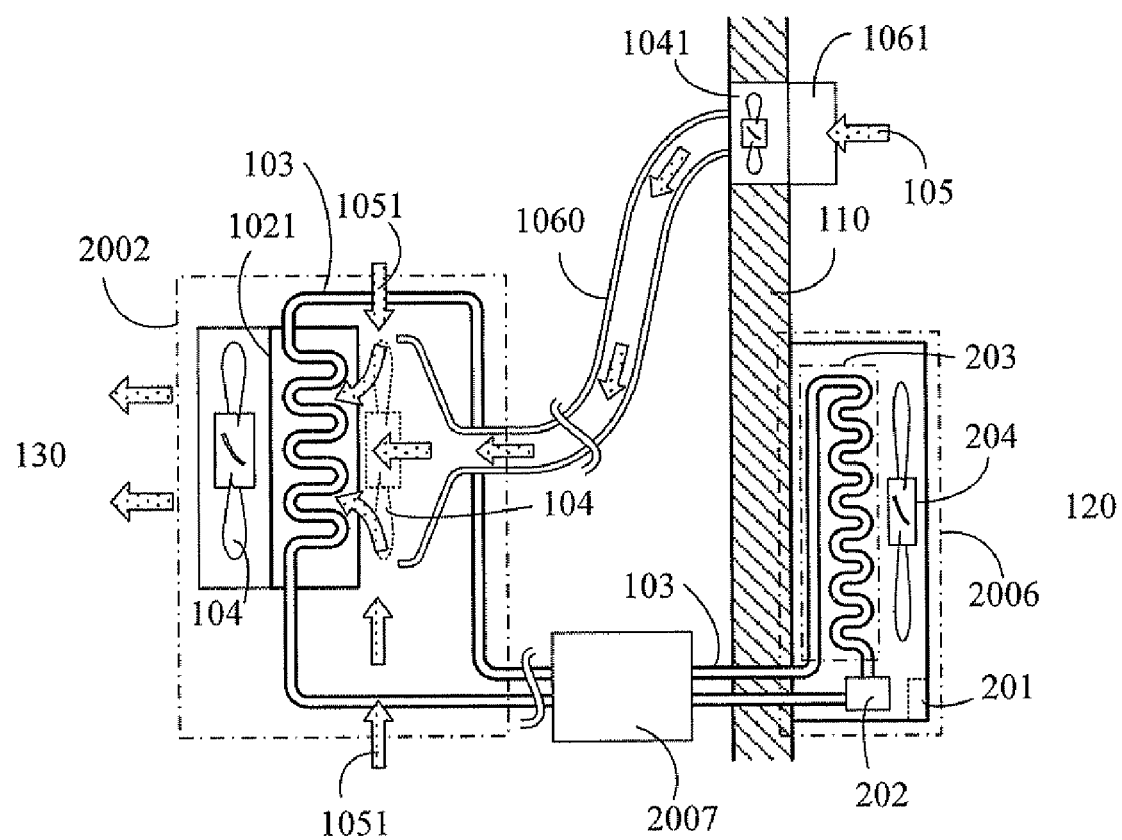
FIG. 24 is a structural schematic view of an embodiment of present invention having a split type air conditioning device outdoor unit (2002) composed of an external heat exchanger (1021) and an airflow exhausting fan unit (104), having a split type air conditioning device outdoor main station (2007) which is individually installed, having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above three, and separately mounting a blowing pump (1041) and a exhaust amount regulating device (1061) in the thermal insulation device (110) and installing a fluid exhausting path (1060) and introducing external airflow (1051) in the air conditioning object space (120) between the exhaust amount regulating device (1061), the blowing pump (1041) and the external heat exchanger (1021).

FIG. 24 is a structural schematic view of an embodiment of present invention having a split type air conditioning device outdoor unit (2002) composed of an external heat exchanger (1021) and an airflow exhausting fan unit (104), having a split type air conditioning device outdoor main station (2007) which is individually installed, having a split type air conditioning device indoor unit (2006) composed of an internal heat exchanger (203), an flow regulating device (202), a control device (201) and a conditioned airflow blowing fan (204), having a coolant compressing and circulating loop constructed by a coolant fluid pipeline (103) installed between the above three, and separately mounting a blowing pump (1041) and a exhaust amount regulating device (1061) in the thermal insulation device (110) and installing a fluid exhausting path (1060) and introducing external airflow (1051) in the air conditioning object space (120) between the exhaust amount regulating device (1061), the blowing pump (1041) and the external heat exchanger (1021).

As shown in FIG. 24, the main configuration is installing a split type air conditioning device outdoor unit (2002) composed of an external heat exchanger (1021) and an airflow exhausting fan unit (104), installing a split type air conditioning device outdoor main station (2007) which is individually installed, and installing a split type air conditioning device indoor unit (2006) composed of an internal heat exchanger (203), a flow regulating device (202), a control device (201) and a conditioned airflow blowing fan (204), and forming a coolant compressing and circulating loop constructed by a coolant fluid pipeline (103) installed between the above three, and separately mounting a blowing pump (1041) and a exhaust amount regulating device (1061) in the thermal insulation device (110), and installing a fluid exhausting path (1060) and introducing external airflow (1051) in the air conditioning object space (120) between the exhaust amount regulating device (1061), the blowing pump (1041) and the external heat exchanger (1021); wherein split type air conditioning device outdoor unit (2002), installed with the external heat exchanger (1021), the coolant fluid pipeline (103), the airflow exhausting fan unit (104) and the individually installed split type air conditioning device outdoor main station (2007), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;

the thermal insulation device (110) is separately mounted with the exhaust amount regulating device (1061), the blowing pump (1041) and the fluid exhausting path (1060);

the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);

the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);

coolant fluid pipeline (103), constituted by a pipeline device for connecting the split type air conditioning device outdoor main station (2007) which is individually installed and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

In summary, the air conditioning device utilizing temperature differentiation of exhausted gas to even temperature of external heat exchanger relates to a cooling/heating air conditioning device for regulating temperature, which pumps an airflow exhausted from a space in an air conditioning object such as inside of a room or vehicle to the external through the external heat exchanger disposed at the external of the air conditioning object such as outside of the room or vehicle so as to equalize the temperature of the fluid flowing through the internal of the external heat exchanger by means of the temperature difference between the internal and external of the air conditioning object for achieving an energy saving effect.

The invention claimed is:
1. An air conditioning device utilizing temperature differentiation of exhausted gas to even temperature of external heat exchanger, which relates to a cooling/heating air conditioning device for regulating temperature, which pumps the air conditioning object space exhausted fluid (105) in an air conditioning object such as the indoor or the internal of a vehicle, and/or pumps the external airflow (1051) through the external heat exchanger (1021) disposed at the external of the air conditioning object such as the outdoor or the outside of a vehicle, so as to perform heat exchange with the coolant fluid pipeline (103) passing through the internal of the external heat exchanger device by means of the temperature differentiation between the two fluids; when the air conditioning device is operated as a cooler, the airflow of a relatively lower temperature exhausted from the space of the air conditioning object such as the inside of the room can be used to facilitate the decreasing of the temperature of the external heat exchanger which is disposed outdoors as a condenser, and when the air conditioning device is operated as a heat pump to supply hot air, the exhausted airflow of a relatively higher temperature can be used to facilitate the increasing of the temperature of the external heat exchanger which is disposed outdoors as an evaporator, and the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having exhaust amount regulating device (1061) and a fluid exhausting path (1060) for the air conditioning object space exhausted fluid (105) to flow through, and further to exhaust to the external temperature differentiation space (130) through the external heat exchanger (1021);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

a blowing pump (1041) or an external heat exchanger airflow exhausting fan unit (104) is installed at one or more than one of the three locations including the fluid exhausting path (1060) or the inlet side or the outlet side of the external heat exchanger (1021), so as to pump the air conditioning object space exhausted fluid (105) to exhaust to the external temperature differentiation space (130) through the external heat exchanger (1021);

said external heat exchanger airflow exhausting fan unit (104) and said blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the fluid exhausting path (1060), or for simultaneously pumping the air conditioning object space exhausted fluid (105) and the external airflow (1051), so as to exhaust to the external temperature differentiation space (130) through the external heat exchanger (1021), enabling two airflows to exhaust to the external temperature differentiation space (130) through the external heat exchanger (1021);

the coolant fluid pipeline (103), which is a circulation pipeline device for coupling the air conditioning device main unit (101) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105);

the operating principles thereof are as follows:

When operated as the function to supply cold air to the air conditioning object space (120), by utilizing both or one of the external heat exchanger airflow exhausting fan unit (104) and/or the exhaust amount regulating device (1061) to pump the air conditioning object space exhausted fluid (105) at a relatively lower temperature in an indoor air conditioning object space (120), or simultaneously pump the air conditioning object space exhausted fluid (105) and the external airflow (1051) flowing through the external heat exchanger (1021), the effect of lowing the temperature of the external heat exchanger (1021) is enhanced, and thereby facilitating the enhancing of the cooling air conditioning efficiency;

when operated as an heat pump function to supply hot air to the air conditioning object space (120), by pumping the air conditioning object space exhausted fluid (105) having relatively higher temperature to the external heat exchanger (1021) through the external heat exchanger (1021), the effect of raising the temperature of the external heat exchanger (1021) is enhanced, and thereby facilitating to enhance the heating air conditioning efficiency;

the air conditioning device utilizing temperature differentiation of exhausted gas to even temperature of external heat exchanger of the present invention includes to pump the airflow passing through the external of the external heat exchanger (1021) by means of the external heat exchanger airflow exhausting fan unit (104), and for the blowing pump (1041);

according to the air conditioning device utilizing temperature differentiation of exhausted gas to even temperature of external heat exchanger, with a thermal insulation device (110) constructed in the object location, the air conditioning object space (120) and the external temperature differentiation space (130) can be insulated, the thermal insulation structure (110) includes the wall of a building, the housing of a carrier or the enclosure of a mechanism made of a heat insulation material or a material having even better heat insulation properties;

according to the air conditioning device utilizing temperature differentiation of exhausted gas to even temperature of external heat exchanger, the mentioned air conditioning object space (120) is often defined as the internal of a building or the internal of a vehicle or the internal of a boat or the internal of an aircraft or the internal of an equipment device, which allows the air conditioning device to perform temperature-raising regulation or temperature-lowering regulation; the mentioned air conditioning object space exhausted fluid (105) is defined as the airflow exhausted from the internal of the air conditioning object space (120) and flowing through the external heat exchanger (1021);

according to the air conditioning device utilizing temperature differentiation of exhausted gas to even temperature of external heat exchanger, the mentioned external temperature differentiation space (130) is defined as the external space insulated from the air conditioning object space (120) through the thermal insulation device (110);

according to the air conditioning device utilizing temperature differentiation of exhausted gas to even temperature of external heat exchanger, the mentioned external airflow (1051) is defined as the airflow surrounding the external temperature differentiation space (130);

in the air conditioning device utilizing temperature differentiation of exhausted gas to even temperature of external heat exchanger, the temperature of the air conditioning object space exhausted fluid (105) includes higher than that of an heat exchanger to the external disposed externally of an temperature regulator;

in the air conditioning device utilizing temperature differentiation of exhausted gas to even temperature of external heat exchanger, the temperature of the air conditioning object space exhausted fluid (105) includes lower than that of an heat exchanger to the external disposed externally of an temperature regulator;

in the air conditioning device utilizing temperature differentiation of exhausted gas to even temperature of external heat exchanger, the exhausted air conditioning object space exhausted fluid (105) includes to heat exchange with the coolant fluid pipeline (103) disposed in the external heat exchanger (1021) in the external space or a surface of the external heat exchanger (1021);

the air conditioning device utilizing temperature differentiation of exhausted gas to even temperature of external heat exchanger of the present invention is formed by applying the aforementioned operating principles to various types of air conditioning devices including integral air conditioning devices, or split type air conditioning devices, or using the cooling tower to replace the cooling tower type air conditioning device of the external heat exchanger (1021).

2. An air conditioning device utilizing temperature differentiation of exhausted gas to even temperature of external heat exchanger as claimed in claim 1, wherein it includes to be applied to an integral air conditioning device with an external heat exchanger airflow exhausting fan unit (104) and a fluid exhausting path (106) so as to pump an air conditioning object space exhausted fluid (105) and an external airflow (1051) to flow together through an external heat exchanger (1021), and the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having an exhaust amount regulating device (1061), and a fluid exhausting path (106) formed by a housing for allowing air conditioning object space exhausted fluid (105) to flow to the external heat exchanger (1021);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the fluid exhausting path (106), enabling two airflows to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (106), which is a fluid passage structure for permitting the exhaust of the air conditioning object space exhausted fluid (105);

whereby an integral air conditioning device assembly (1000) is formed by the abovementioned structures.

3. An air conditioning device utilizing temperature differentiation of exhausted gas to even temperature of external heat exchanger as claimed in claim 1, wherein it includes to be applied to an integral air conditioning device without a heat exchanger airflow exhausting fan unit (104) and a ventilating device (1041) commonly constructed with a fluid exhausting path (106) so as to pump an air conditioning object space exhausted fluid (105) to flow through an external heat exchanger (1021), and the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (106) formed by a housing, and having an exhaust amount regulating device (1061) and the blowing pump (1041);

the external heat exchanger (1021), provided with the coolant fluid pipeline (103) for allowing the coolant passed from the main unit to heat exchange with the air conditioning object space exhausted fluid (105) through the external heat exchanger (1021);

the coolant fluid pipeline (103), which is a circulation pipeline device for coupling the air conditioning device main unit (101) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the fluid exhausting path (106), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (106), which is a fluid passage structure for permitting the exhaust of the air conditioning object space exhausted fluid (105);

whereby an integral air conditioning device assembly (1000) is formed by the abovementioned structures.

4. An air conditioning device utilizing temperature differentiation of exhausted gas to even temperature of external heat exchanger as claimed in claim 1, wherein it includes to be applied to a fluid exhausting path (1060) and an external heat exchanger airflow exhausting fan unit (104) so as to pump an air conditioning object space exhausted fluid (105) and an external airflow (1051) to flow together through an external heat exchanger (1021) in the air conditioning device assembly (1000), and the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (1060) and an exhaust amount regulating device (1061);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the fluid exhausting path (1060), enabling two airflows to exhaust to the external temperature differentiation space (130) through the external heat exchanger (1021);

whereby an air conditioning device assembly (1000) is formed by the abovementioned structures;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

5. An air conditioning device utilizing temperature differentiation of exhausted gas to even temperature of external heat exchanger as claimed in claim 1, wherein it includes to be applied to a separately mounted blowing pump (1041) and an exhaust amount regulating device (1061) and having an air conditioning device assembly (1000) without the external heat exchanger airflow exhausting fan unit (104), and the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (1060), an exhaust amount regulating device (1061), a blowing pump (1041);

the external heat exchanger (1021), provided with the coolant fluid pipeline (103) for allowing the coolant passed from the main unit to heat exchange with the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

whereby an air conditioning device assembly (1000) is formed by the abovementioned structures;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

6. An air conditioning device utilizing temperature differentiation of exhausted gas to even temperature of external heat exchanger as claimed in claim 1, wherein it includes to be applied to an air conditioning device assembly (1000) mounted with an external heat exchanger airflow exhausting fan unit (104) and the fluid exhausting path (1060) and the blowing pump (1041), and the main configurations are as follows:

an air conditioning device main unit (101), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (1060) and a blowing pump (1041);

the external heat exchanger (1021), provided with the coolant fluid pipeline (103) for allowing the coolant passed from the main unit to heat exchange with the external airflow (1051) of the external temperature differentiation space (130) of the external heat exchanger (1021) and the air conditioning object space exhausted fluid (105);

the coolant fluid pipeline (103), which is a circulation pipeline device for coupling the air conditioning device main unit (101) and the external heat exchanger (1021), in which a gas or liquid coolant is circulated;

an external heat exchanger airflow exhausting fan unit (104), comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation which is pumped from the air conditioning object space (120) through the exhaust amount regulating device (1061) and the fluid exhausting path (1060) by the blowing pump (1041), enabling two airflows to exhaust to the external temperature differentiation space (130) through the external heat exchanger (1021);

whereby an air conditioning device assembly (1000) is formed by the abovementioned structures;

a blowing pump (1041), comprising an air blowing or exhausting fan unit or an air pump driven by an electric motor, for pumping the air conditioning object space exhausted fluid (105) with a temperature differentiation from the air conditioning object space (120) through the exhaust amount regulating device (1061) and the fluid exhausting path (1060), so as to exhaust to the external temperature differentiation space (130) through the external heat exchanger (1021), enabling two airflows to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

7. An air conditioning device utilizing temperature differentiation of exhausted gas to even temperature of external heat exchanger as claimed in claim 1, wherein it includes to be applied to a split type air conditioning device outdoor unit (2002) with an external heat exchanger airflow exhausting fan unit (104) and a split type air conditioning device main unit (2001) mounted with the fluid exhausting path (1060), and the main configurations are as follows:

a split type air conditioning device main unit (2001), essentially consisted of a throttle device, an internal heat exchanger (203), a compression device, pipelines, a control device (201), an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a fluid exhausting path (1060) and an exhaust amount regulating device (1061);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the fluid exhausting path (1060), and enabling two airflows to exhaust to the external temperature differentiation space (130) through the external heat exchanger (1021);

the coolant fluid pipeline (103), which is a circulation pipeline device for coupling the air conditioning device main unit (101) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

8. An air conditioning device utilizing temperature differentiation of exhausted gas to even temperature of external heat exchanger as claimed in claim 1, wherein it includes to be applied to the split type air conditioning device main unit (2001) commonly constructed with the blowing pump (1041) and having a split type air conditioning device outdoor unit (2002) without the external heat exchanger airflow exhausting fan unit (104), and the main configurations are as follows:

a split type air conditioning device main unit (2001), essentially consisted of a throttle device, an internal heat exchanger (203), a compression device, pipelines, a control device (201), an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a fluid exhausting path (1060), an exhaust amount regulating device (1061) and a blowing pump (1041);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the air conditioning object space exhausted fluid (105) by means of the external heat exchanger (1021);

the coolant fluid pipeline (103), which is a circulation pipeline device for coupling the air conditioning device main unit (101) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation which is pumped from the air conditioning object space (120) through the exhaust amount regulating device (1061) and the fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

9. An air conditioning device utilizing temperature differentiation of exhausted gas to even temperature of external heat exchanger as claimed in claim 1, wherein it includes to be applied to the separately mounted fluid exhausting path (1060), the split type air conditioning device main unit (2001) and the split type air conditioning device outdoor unit (2002) with the external heat exchanger airflow exhausting fan unit (104), and the main configurations are as follows:

a split type air conditioning device main unit (2001), essentially consisted of a throttle device, an internal heat exchanger (203), a compression device, pipelines, a control device (201), an air conditioning airflow blower and a housing, and coupled to a pipeline of the external heat exchanger (1021) mounted in a split type air conditioning device outdoor unit (2002) in an external temperature differentiation space (130) to form a circulating path by means of a coolant fluid pipeline (103); and having a fluid exhausting path (1060) and an exhaust amount regulating device (1061);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the fluid exhausting path (1060), enabling two airflows to exhaust to the external temperature differentiation space (130) through the external heat exchanger (1021);

the coolant fluid pipeline (103), which is a circulation pipeline device for coupling the split type air conditioning device main unit (2001) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

10. An air conditioning device utilizing temperature differentiation of exhausted gas to even temperature of external heat exchanger as claimed in claim 1, wherein it includes to be applied to the separately mounted blowing pump (1041), the split type air conditioning device main unit (2001) and the split type air conditioning device outdoor unit (2002) without the external heat exchanger airflow exhausting fan unit (104), and the main configurations are as follows:

a split type air conditioning device main unit (2001), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (1060), an exhaust amount regulating device (1061) and a blowing pump (1041);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the air conditioning object space exhausted fluid (105) by means of the external heat exchanger (1021);

the coolant fluid pipeline (103), which is a circulation pipeline device for coupling split type air conditioning device main unit (2001) and the external heat exchanger (1021), in which a gas or liquid coolant is circulated;

a blowing pump (1041), comprising an air blowing or exhausting fan unit or an air pump driven by an electric motor, for pumping the air conditioning object space exhausted fluid (105) with a temperature differentiation which is pumped from the air conditioning object space (120) through the exhaust amount regulating device (1061) and the fluid exhausting path (1060), so as to exhaust to the external temperature differentiation space (130) through the external heat exchanger (1021);

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

11. An air conditioning device utilizing temperature differentiation of exhausted gas to even temperature of external heat exchanger as claimed in claim 1, wherein it includes to be applied to the split type air conditioning device main unit (2001), the split type air conditioning device outdoor unit (2002) with the external heat exchanger airflow exhausting fan unit (104) and the separately mounted blowing pump (1041), and the main configurations are as follows:

a split type air conditioning device main unit (2001), essentially consisted of a throttle device, an internal heat exchanger (203), a compression device, pipelines, a control device (201), an air conditioning airflow blower and a housing, and coupled to a pipeline of the external heat exchanger (1021) mounted in an external temperature differentiation space (130) to form a circulating path by means of a coolant fluid pipeline (103); and having a fluid exhausting path (1060), the exhaust amount regulating device (1061) and the blowing pump (1041);

the split type air conditioning device outdoor unit (2002), having a housing and the external heat exchanger (1021), wherein the external heat exchanger (1021) being provided with the coolant fluid pipeline (103) for allowing the coolant passed from the split type air conditioning device main unit (2001) to heat exchange with the external, airflow (1051) of the external temperature differentiation space (130) of the external heat exchanger (1021) and the air conditioning object space exhausted fluid (105), and having an external heat exchanger airflow exhausting fan unit (104), wherein the external heat exchanger airflow exhausting fan unit (104) comprising an air blowing or exhausting fan unit or an air pump driven by an electric motor, for pumping the external airflow (1051) of the external temperature differentiation space (130) and for pumping the air conditioning object space exhausted fluid (105) with a temperature differentiation from the air conditioning object space (120) through the exhaust amount regulating device (1061) and the fluid exhausting path (1060), enabling two airflows to exhaust to the external temperature differentiation space (130) through the external heat exchanger (1021);

the coolant fluid pipeline (103), which is a circulation pipeline device for coupling the split type air conditioning device main unit (2001) and the external heat exchanger (1021), in which a gas or liquid coolant is circulated;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

12. An air conditioning device utilizing temperature differentiation of exhausted gas to even temperature of external heat exchanger as claimed in claim 1, wherein it includes to be applied to a water-cooled air conditioning device main unit (2005), a powered fan provided cooling tower (2003) and the separately mounted blowing pump (1041), and the main configurations are as follows:

a water-cooled air conditioning device main unit (2005), which is an air conditioning device main unit essentially consisted of a throttle device, an internal heat exchanger (203), a compression device, pipelines, a control device (201), an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of the powered fan provided cooling tower (2003) disposed in the external temperature differentiation space (130) so as to form a path of water circulation; and having the fluid exhausting path (1060), the exhaust amount regulating device (1061) and the blowing pump (1041), and by means of the blowing pump (1041) to pump the air conditioning object space exhausted fluid (105) through the fluid exhausting path (1060) and the exhaust amount regulating device (1061) to an air inlet of the powered fan provided cooling tower (2003);

the powered fan provided cooling tower (2003), comprising a cooling tower equipped with the cooling tower fan unit (108), for example, a counterflow mechanical draft cooling tower, an induced counterflow mechanical draft cooling tower, a counterflow cooling tower, a crossflow mechanical draft cooling tower, or an evaporative cooling tower, and the powered fan provided cooling tower (2003) having an air inlet, so that the air conditioning object space exhausted fluid (105) pumped from the air conditioning object space (120) through the blowing pump (1041) is directed through the fluid exhausting path (1060) into the air inlet of the powered fan provided cooling tower (2003), and passing through the powered fan provided cooling tower (2003) so as to cool the waterflow and then is exhausted to the surrounding through the cooling tower fan unit (108), and having a water in and out pipe (109) for connecting the water pipe (107) so as to allow the cooling water to circulate between the powered fan provided cooling tower (2003) and the water-cooled air conditioning device main unit (2005);

the water pipe (107), disposed between a water-cooled condensing device of the water-cooled air conditioning device main unit (2005) and the water in and out pipe (109) of the powered fan provided cooling tower (2003);

the cooling tower fan unit (108), comprising an air blowing or exhausting fan unit or an air pump driven by an electric motor, and having one or more following operation functions, including: 1) pumping the external airflow (1051) of the external temperature differentiation space (130) to the external temperature differentiation space (130) through the inside of the powered fan provided cooling tower (2003); 2) pumping the air conditioning object space exhausted fluid (105) with a temperature differentiation from the air conditioning object space (120) through the exhaust amount regulating device (1061), the blowing pump (1041) and the fluid exhausting path (1060) to the external temperature differentiation space (130) through the powered fan provided cooling tower (2003); 3) enabling the external airflow (1051) and the air conditioning object space exhausted fluid (105) to exhaust commonly to the external temperature differentiation space (130) through the powered fan provided cooling tower (2003);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

13. An air conditioning device utilizing temperature differentiation of exhausted gas to even temperature of external heat exchanger as claimed in claim 1, wherein it includes to be applied to a water-cooled air conditioning device main unit (2005) and a powered fan provided cooling tower (2003), and the main configurations are as follows:

a water-cooled air conditioning device main unit (2005), which is an air conditioning device main unit essentially consisted of a throttle device, an internal heat exchanger (203), a compression device, pipelines, a control device (201), an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of the powered fan provided cooling tower (2003) disposed in the external temperature differentiation space (130) so as to form a path of water circulation; and having a fluid exhausting path (1060) and an exhaust amount regulating device (1061) for delivering the air conditioning object space exhausted fluid (105) to an air inlet of the powered fan provided cooling tower (2003);

the powered fan provided cooling tower (2003), comprising a cooling tower equipped with the cooling tower fan unit (108), for example, a counterflow mechanical draft cooling tower, an induced counterflow mechanical draft cooling tower, a counterflow cooling tower, a crossflow mechanical draft cooling tower, or an evaporative cooling tower, and the powered fan provided cooling tower (2003) having an air inlet, so that the air conditioning object space exhausted fluid (105) pumped from the air conditioning object space (120) is directed through the fluid exhausting path (1060) into the air inlet of the powered fan provided cooling tower (2003), and is passing through the powered fan provided cooling tower (2003) so as to cool the waterflow, and then is exhausted to the surrounding through the cooling tower fan unit (108), and having a water in and out pipe (109) for connecting the water pipe (107) so as to allow the cooling water to circulate between the powered fan provided cooling tower (2003) and the water-cooled air conditioning device main unit (2005);

the water pipe (107), disposed between a water-cooled condensing device of the water-cooled air conditioning device main unit (2005) and the water in and out pipe (109) of the powered fan provided cooling tower (2003);

the cooling tower fan unit (108), comprising an air blowing or exhausting fan unit or an air pump driven by an electric motor, and having one or more following operation functions, including: 1) pumping the external airflow (1051) of the external temperature differentiation space (130) to the external temperature differentiation space (130) through the inside of the powered fan provided cooling tower (2003); 2) pumping the air conditioning object space exhausted fluid (105) with a temperature differentiation from the air conditioning object space (120) through the exhaust amount regulating device (1061) and the fluid exhausting path (1060) to the external temperature differentiation space (130) through the powered fan provided cooling tower (2003); 3) enabling the external airflow (1051) and the air conditioning object space exhausted fluid (105) to exhaust commonly to the external temperature differentiation space (130) through the powered fan provided cooling tower (2003);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

14. An air conditioning device utilizing temperature differentiation of exhausted gas to even temperature of external heat exchanger as claimed in claim 1, wherein it includes to be applied to a water-cooled air conditioning device main unit (2005), a natural draft cooling tower (2003) and the separately mounted blowing pump (1041), and the main configurations are as follows:

a water-cooled air conditioning device main unit (2005), which is an air conditioning device main unit essentially consisted of a throttle device, an internal heat exchanger (203), a compression device, pipelines, a control device (201), an air conditioning airflow blower water-cooled cooling device and a housing, and a water pipe (107) of the water-cooled condensing device disposed in the water-cooled air conditioning device main unit (2005) being coupled to a water in and out pipe (109) of a water inlet and water exhaust pipeline of a natural draft cooling tower (2004) disposed in the external temperature differentiation space (130) so as to form a path of water circulation; and having the fluid exhausting path (1060), the exhaust amount regulating device (1061) and the blowing pump (1041), and by means of the blowing pump (1041) to pump the air conditioning object space exhausted fluid (105) to an air inlet of the natural draft cooling tower (2004) through the fluid exhausting path (1060) and the exhaust amount regulating device (1061);

a natural draft cooling tower (2004), comprising a natural draft cooling tower, for example, a crossflow natural draft cooling tower, and the natural draft cooling tower (2004) having an air inlet, and having one or more following operating functions, including: 1) directing the external airflow (1051) from the external temperature differentiation space (130) into the air inlet of the natural draft cooling tower (2004), and passing through the natural draft cooling tower (2004) so as to cool the waterflow, and then exhausting the same to the surrounding through the cooling tower; 2) directing the air conditioning object space exhausted fluid (105) pumped from the air conditioning object space (120) by means of the blowing pump (1041) through the fluid exhausting path (1060) into the air inlet of the natural draft cooling tower (2004), and passing through the natural draft cooling tower (2004) so as to cool the waterflow, and then exhausting the same to the surrounding through the cooling tower; 3) directing the air conditioning object space exhausted fluid (105) and the external airflow (1051) into the air inlet of the natural draft cooling tower (2004), and passing through the natural draft cooling tower (2004) so as to cool the waterflow, and then exhausting the same to the surrounding through the cooling tower; and having a water in and out pipe (109) for coupling the water pipe (107) so as to allow the cooling water to circulate between the natural draft cooling tower (2004) and the water-cooled air conditioning device main unit (2005);

the water pipe (107), disposed between a water-cooled condensing device of the water-cooled air conditioning device main unit (2005) and the water in and out pipe (109) of the natural draft cooling tower (2004);

a water pump (111), for pumping a cooling water between the water-cooled air conditioning device main unit (2005) and the powered fan provided cooling tower (2003) through the water pipe (107) and the water in and out pipe (109) for cooling circulation;

the exhaust amount regulating device (1061), formed by a fluid gate, a shutoff gate or valve for operating and adjusting the exhaust amount of the air conditioning object space exhausted fluid (105);

the fluid exhausting path (1060), which is a fluid passage structure for permitting the exhaust of the air conditioning object space exhausted fluid (105).

15. An air conditioning device utilizing temperature differentiation of exhausted gas to even temperature of external heat exchanger as claimed in claim 1, wherein it further applied to a spilt type air conditioning device, which mainly includes a split type air conditioning device outdoor unit (2002) therein having a split type air conditioning device outdoor main station (2007) and an external heat exchanger (1021) and an airflow exhausting fan unit (104), and a split type air conditioning device indoor unit (2006) therein having an internal heat exchanger (203), a flow regulating device (202), a conditioned airflow blowing fan (204) and a control device (201), and a coolant compressing and circulating loop constructed by a coolant fluid pipeline (103) being installed therebetween, and a fluid exhausting path (1060) being installed from the air conditioning object space (120) to the external heat exchanger (1021) for facilitating the applications in various separated space.

16. An air conditioning device utilizing temperature differentiation of exhausted gas to even temperature of external heat exchanger as claimed in claim 15, wherein the main configuration is installing a split type air conditioning device outdoor unit (2002) composed of an external heat exchanger (1021) and an airflow exhausting fan unit (104) and a split type air conditioning device outdoor main station (2007), and installing a split type air conditioning device indoor unit (2006) composed of an internal heat exchanger (203), a flow regulating device (202), a control device (201), a conditioned airflow blowing fan (204) and an exhaust amount regulating device (1061), and forming a coolant compressing and circulating loop constructed by a coolant fluid pipeline (103) installed between the above two, and installing a fluid exhausting path (1060) and introducing external airflow (1051) in the air conditioning object space (120) between the exhaust amount regulating device (1061) and the external heat exchanger (1021); and wherein split type air conditioning device outdoor unit (2002), installed with the split type air conditioning device outdoor main station (2007), the external heat exchanger (1021), the coolant fluid pipeline (103) and the airflow exhausting fan unit (104), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device; the split type air conditioning device indoor unit (2006) is further installed with the exhaust amount regulating device (1061) and the fluid exhausting path (1060);

the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);

the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and fluid exhausting path (1060) can be individually installed or jointly constituted as a pipeline structure.

17. An air conditioning device utilizing temperature differentiation of exhausted gas to even temperature of external heat exchanger as claimed in claim 15, wherein the main configuration is installing a split type air conditioning device outdoor unit (2002) composed of an external heat exchanger (1021) and a split type air conditioning device outdoor main station (2007), and installing a split type air conditioning device indoor unit (2006) composed of an internal heat exchanger (203), a flow regulating device (202), a control device (201), a conditioned airflow blowing fan (204), a blowing pump (1041) and an exhaust amount regulating device (1061), and forming a coolant compressing and circulating loop constructed by a coolant fluid pipeline (103) installed between the above two, and installing a fluid exhausting path (1060) in the air conditioning object space (120) between the exhaust amount regulating device (1061), the blowing pump (1041) and the external heat exchanger (1021); and wherein split type air conditioning device outdoor unit (2002), installed with the split type air conditioning device outdoor main station (2007), the external heat exchanger (1021) and the coolant fluid pipeline (103), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device; the split type air conditioning device indoor unit (2006) is further installed with the exhaust amount regulating device (1061), the blowing pump (1041) and the fluid exhausting path (1060);

the external heat exchanger (1021) of the split type air conditioning device outdoor unit (2002) is installed with the coolant fluid pipeline (103) allowing the coolant to flow through so as to exchange heat with the air conditioning object space exhausted fluid (105);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

18. An air conditioning device utilizing temperature differentiation of exhausted gas to even temperature of external heat exchanger as claimed in claim 15, wherein the main configuration is installing a split type air conditioning device outdoor unit (2002) composed of an external heat exchanger (1021) and an airflow exhausting fan unit (104) and a split type air conditioning device outdoor main station (2007), installing a split type air conditioning device indoor unit (2006) composed of an internal heat exchanger (203), an flow regulating device (202), a control device (201) and a conditioned airflow blowing fan (204), forming a coolant compressing and circulating loop constructed by a coolant fluid pipeline (103) installed between the above two, and separately mounting a exhaust amount regulating device (1061) in the thermal insulation device (110), and installing a fluid exhausting path (1060) and introducing external airflow (1051) in the air conditioning object space (120) between the exhaust amount regulating device (1061) and the external heat exchanger (1021); wherein split type air conditioning device outdoor unit (2002), installed with the split type air conditioning device outdoor main station (2007), the external heat exchanger (1021), the coolant fluid pipeline (103) and the airflow exhausting fan unit (104), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;

the thermal insulation device (110) is separately mounted with the exhaust amount regulating device (1061) and the fluid exhausting path (1060);

the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);

the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

19. An air conditioning device utilizing temperature differentiation of exhausted gas to even temperature of external heat exchanger as claimed in claim 15, wherein the main configuration is installing a split type air conditioning device outdoor unit (2002) composed of an external heat exchanger (1021) and a split type air conditioning device outdoor main station (2007), and installing a split type air conditioning device indoor unit (2006) composed of an internal heat exchanger (203), a flow regulating device (202), a control device (201), a conditioned airflow blowing fan (204), and forming a coolant compressing and circulating loop constructed by a coolant fluid pipeline (103) installed between the above two, and separately mounting a blowing pump (1041) and a exhaust amount regulating device (1061) in the thermal insulation device (110), and installing a fluid exhausting path (1060) in the air conditioning object space (120) between the exhaust amount regulating device (1061), the blowing pump (1041) and the external heat exchanger (1021); wherein split type air conditioning device outdoor unit (2002), installed with the split type air conditioning device outdoor main station (2007), the external heat exchanger (1021) and the coolant fluid pipeline (103), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;

the thermal insulation device (110) is separately mounted with the exhaust amount regulating device (1061), the blowing pump (1041) and the fluid exhausting path (1060);

the external heat exchanger (1021) of the split type air conditioning device outdoor unit (2002) is installed with the coolant fluid pipeline (103) allowing the coolant to flow through so as to exchange heat with the air conditioning object space exhausted fluid (105);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

blowing pump (1041), constituted by an air blowing or air exhausting fan unit or an air pump driven by an electric motor, for pumping the air conditioning object space exhausted fluid (105) with a relative temperature differentiation from the air conditioning object space (120) through the exhaust amount regulating device (1061) and the fluid exhausting path (1060) and exchanging heat while flowing through the external heat exchanger (1021) then being exhausted to the external temperature differentiation space (130);

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

20. An air conditioning device utilizing temperature differentiation of exhausted gas to even temperature of external heat exchanger as claimed in claim 15, wherein the main configuration is installing a split type air conditioning device outdoor unit (2002) composed of an external heat exchanger (1021) and an airflow exhausting fan unit (104) and a split type air conditioning device outdoor main station (2007), installing a split type air conditioning device indoor unit (2006) composed of an internal heat exchanger (203), an flow regulating device (202), a control device (201) and a conditioned airflow blowing fan (204), forming a coolant compressing and circulating loop constructed by a coolant fluid pipeline (103) installed between the above two, and separately mounting a blowing pump (1041) and a exhaust amount regulating device (1061) in the thermal insulation device (110), and installing a fluid exhausting path (1060) and introducing external airflow (1051) in the air conditioning object space (120) between the exhaust amount regulating device (1061), the blowing pump (1041) and the external heat exchanger (1021); wherein split type air conditioning device outdoor unit (2002), installed with the split type air conditioning device outdoor main station (2007), the external heat exchanger (1021), the coolant fluid pipeline (103) and the airflow exhausting fan unit (104), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;

the thermal insulation device (110) is separately mounted with the exhaust amount regulating device (1061), the blowing pump (1041) and the fluid exhausting path (1060);

the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);

the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

21. An air conditioning device utilizing temperature differentiation of exhausted gas to even temperature of external heat exchanger as claimed in claim 15, wherein the main configuration is installing a split type air conditioning device outdoor unit (2002) composed of an external heat exchanger (1021) and an airflow exhausting fan unit (104), installing a split type air conditioning device outdoor main station (2007) which is individually installed, and installing a split type air conditioning device indoor unit (2006) composed of an internal heat exchanger (203), a flow regulating device (202), a control device (201), a conditioned airflow blowing fan (204) and an exhaust amount regulating device (1061), and forming a coolant compressing and circulating loop constructed by a coolant fluid pipeline (103) installed between the above three, and installing a fluid exhausting path (1060) and introducing external airflow (1051) in the air conditioning object space (120) between the exhaust amount regulating device (1061) and the external heat exchanger (1021); wherein split type air conditioning device outdoor unit (2002), installed with the external heat exchanger (1021), the coolant fluid pipeline (103), the airflow exhausting fan unit (104) and the individually installed split type air conditioning device outdoor main station (2007), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device; the split type air conditioning device indoor unit (2006) is further installed with the exhaust amount regulating device (1061) and the fluid exhausting path (1060);

the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);

the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);
coolant fluid pipeline (103), constituted by a pipeline device for connecting the split type air conditioning device outdoor main station (2007) which is individually installed and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;
exhaust amount regulating device (1061), constituted by a fluid gate, a shutoff gate or valve for operating and regulating the exhaust amount of the air conditioning object space exhausted fluid (105);
fluid exhausting path (1060), constituted by a fluid passage structure for exhausting the exhaust amount of the air conditioning object space exhausted fluid (105) from the air conditioning object space (120);
the coolant fluid pipeline (103) and the fluid exhausting path (1060) can be individually installed or jointly constituted as a pipeline structure.

22. An air conditioning device utilizing temperature differentiation of exhausted gas to even temperature of external heat exchanger as claimed in claim 15, wherein the main configuration is installing a split type air conditioning device outdoor unit (2002) composed of an external heat exchanger (1021), installing a split type air conditioning device outdoor main station (2007) which is individually installed, and installing a split type air conditioning device indoor unit (2006) composed of an internal heat exchanger (203), a flow regulating device (202), a control device (201), a conditioned airflow blowing fan (204), a blowing pump (1041) and an exhaust amount regulating device (1061), and forming a coolant compressing and circulating loop constructed by a coolant fluid pipeline (103) installed between the above three, and installing a fluid exhausting path (1060) in the air conditioning object space (120) between the exhaust amount regulating device (1061), the blowing pump (1041) and the external heat exchanger (1021); wherein
split type air conditioning device outdoor unit (2002), installed with the external heat exchanger (1021), the coolant fluid pipeline (103) and the individually installed split type air conditioning device outdoor main station (2007), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);
the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device; the split type air conditioning device indoor unit (2006) is further installed with the exhaust amount regulating device (1061), the blowing pump (1041) and the fluid exhausting path (1060);
the external heat exchanger (1021) of the split type air conditioning device outdoor unit (2002) is installed with the coolant fluid pipeline (103) allowing the coolant to flow through so as to exchange heat with the air conditioning object space exhausted fluid (105);
coolant fluid pipeline (103), constituted by a pipeline device for connecting the split type air conditioning device outdoor main station (2007) which is individually installed and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;
blowing pump (1041), constituted by an air blowing or air exhausting fan unit or an air pump driven by an electric motor, for pumping the air conditioning object space exhausted fluid (105) with a relative temperature differentiation from the air conditioning object space (120) through the exhaust amount regulating device (1061) and the fluid exhausting path (1060) and flowing through the external heat exchanger (1021) then being exhausted to the external temperature differentiation space (130);
exhaust amount regulating device (1061), constituted by a fluid gate, a shutoff gate or valve for operating and regulating the exhaust amount of the air conditioning object space exhausted fluid (105);
fluid exhausting path (1060), constituted by a fluid passage structure for exhausting the exhaust amount of the air conditioning object space exhausted fluid (105) from the air conditioning object space (120);
the coolant fluid pipeline (103) and the fluid exhausting path (1060) can be individually installed or jointly constituted as a pipeline structure.

23. An air conditioning device utilizing temperature differentiation of exhausted gas to even temperature of external heat exchanger as claimed in claim 15, wherein the main configuration is installing a split type air conditioning device outdoor unit (2002) composed of an external heat exchanger (1021) and an airflow exhausting fan unit (104) installing a split type air conditioning device outdoor main station (2007) which is individually installed, and installing a split type air conditioning device indoor unit (2006) composed of an internal heat exchanger (203), a flow regulating device (202), a control device (201) and a conditioned airflow blowing fan (204), and forming a coolant compressing and circulating loop constructed by a coolant fluid pipeline (103) installed between the above three, and separately mounting a exhaust amount regulating device (1061) in the thermal insulation device (110), and installing a fluid exhausting path (1060) and introducing external airflow (1051) in the air conditioning object space (120) between the exhaust amount regulating device (1061) and the external heat exchanger (1021); wherein
split type air conditioning device outdoor unit (2002), installed with the external heat exchanger (1021), the coolant fluid pipeline (103), the airflow exhausting fan unit (104) and the individually installed split type air conditioning device outdoor main station (2007), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;

the thermal insulation device (110) is separately mounted with the exhaust amount regulating device (1061) and the fluid exhausting path (1060);

the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);

the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);

coolant fluid pipeline (103), constituted by a pipeline device for connecting the split type air conditioning device outdoor main station (2007) which is individually installed and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

24. An air conditioning device utilizing temperature differentiation of exhausted gas to even temperature of external heat exchanger as claimed in claim 15, wherein the main configuration is installing a split type air conditioning device outdoor unit (2002) composed of an external heat exchanger (1021), installing a split type air conditioning device outdoor main station (2007) which is individually installed, and installing a split type air conditioning device indoor unit (2006) composed of an internal heat exchanger (203), a flow regulating device (202), a control device (201) and a conditioned airflow blowing fan (204), and forming a coolant compressing and circulating loop constructed by a coolant fluid pipeline (103) installed between the above three, and separately mounting a blowing pump (1041) and a exhaust amount regulating device (1061) in the thermal insulation device (110), and installing a fluid exhausting path (1060) in the air conditioning object space (120) between the exhaust amount regulating device (1061), the blowing pump (1041) and the external heat exchanger (1021); wherein split type air conditioning device outdoor unit (2002), installed with the external heat exchanger (1021), the coolant fluid pipeline (103) and the individually installed split type air conditioning device outdoor main station (2007), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);

the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;

the thermal insulation device (110) is separately mounted with the exhaust amount regulating device (1061), the blowing pump (1041) and the fluid exhausting path (1060);

the external heat exchanger (1021) of the split type air conditioning device outdoor unit (2002) is installed with the coolant fluid pipeline (103) allowing the coolant to flow through so as to exchange heat with the air conditioning object space exhausted fluid (105);

coolant fluid pipeline (103), constituted by a pipeline device for connecting the split type air conditioning device outdoor main station (2007) and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;

blowing pump (1041), constituted by an air blowing or air exhausting fan unit or an air pump driven by an electric motor, for pumping the air conditioning object space exhausted fluid (105) with a relative temperature differentiation from the air conditioning object space (120) through the exhaust amount regulating device (1061) and the fluid exhausting path (1060) and flowing through the external heat exchanger (1021) then being exhausted to the external temperature differentiation space (130);

exhaust amount regulating device (1061), constituted by a fluid gate, a shutoff gate or valve for operating and regulating the exhaust amount of the air conditioning object space exhausted fluid (105);

fluid exhausting path (1060), constituted by a fluid passage structure for exhausting the exhaust amount of the air conditioning object space exhausted fluid (105) from the air conditioning object space (120);

the coolant fluid pipeline (103) and the fluid exhausting path (1060) can be individually installed or jointly constituted as a pipeline structure.

25. An air conditioning device utilizing temperature differentiation of exhausted gas to even temperature of external heat exchanger as claimed in claim 15, wherein the main configuration is installing a split type air conditioning device outdoor unit (2002) composed of an external heat exchanger (1021) and an airflow exhausting fan unit (104), installing a split type air conditioning device outdoor main station (2007) which is individually installed, and installing a split type air conditioning device indoor unit (2006) composed of an internal heat exchanger (203), a flow regulating device (202), a control device (201) and a conditioned airflow blowing fan (204), and forming a coolant compressing and circulating loop constructed by a coolant fluid pipeline (103) installed between the above three, and separately mounting a blowing pump (1041) and a exhaust amount regulating device (1061) in the thermal insulation device (110), and installing a fluid exhausting path (1060) and introducing external airflow (1051) in the air conditioning object space (120) between the exhaust amount regulating device (1061), the blowing pump (1041) and the external heat exchanger (1021); wherein

- split type air conditioning device outdoor unit (2002), installed with the external heat exchanger (1021), the coolant fluid pipeline (103), the airflow exhausting fan unit (104) and the individually installed split type air conditioning device outdoor main station (2007), wherein the split type air conditioning device outdoor main station (2007) mainly includes a compress device and forms a compressing and circulating loop leaded through the coolant fluid pipeline (103) towards the external heat exchanger (1021) and towards the internal heat exchanger (203) and the flow regulating device (202) in the split type air conditioning device indoor unit (2006) installed in the air conditioning object space (120);
- the split type air conditioning device indoor unit (2006) is installed with the internal heat exchanger (203), the flow regulating device (202), the conditioned airflow blowing fan (204) and provided with a control device (201) for controlling operations of inputting electric energy and driving the air conditioning device;
- the thermal insulation device (110) is separately mounted with the exhaust amount regulating device (1061), the blowing pump (1041) and the fluid exhausting path (1060);
- the external heat exchanger (1021) of the split type air conditioning device outdoor unit (2002) is installed with the coolant fluid pipeline (103) allowing the coolant to flow through so as to exchange heat with the external airflow (1051) of the external temperature differentiation space (130) in the external heat exchanger (1021) and the air conditioning object space exhausted fluid (105);
- the external heat exchanger airflow exhausting fan unit (104) installed on the split type air conditioning device outdoor unit (2002) is constituted by an airflow blowing or airflow exhausting fan unit or an air pump driven by an electric motor, wherein an airflow introducing interval is defined between the fluid exhausting path (1060) and the external heat exchanger (1021) for pumping in the external airflow (1051) of the external temperature differentiation space (130) and for pumping the air conditioning object space exhausted fluid (105) with a temperature differentiation and pumped from the air conditioning object space (120) through the exhaust amount regulating device (1061) and the fluid exhausting path (106), thereby enabling two airflows to exchange heat then being exhausted to the external temperature differentiation space (130) through the external heat exchanger (1021);
- coolant fluid pipeline (103), constituted by a pipeline device for connecting the split type air conditioning device outdoor main station (2007) which is individually installed and the external heat exchanger (1021) and the flow regulating device (202) and the internal heat exchanger (203) of the split type air conditioning device indoor unit (2006) for the purpose of circulation, wherein the internal of pipeline allows the gas-state or liquid-state coolant to flow through;
- exhaust amount regulating device (1061), constituted by a fluid gate, a shutoff gate or valve for operating and regulating the exhaust amount of the air conditioning object space exhausted fluid (105);
- fluid exhausting path (1060), constituted by a fluid passage structure for exhausting the exhaust amount of the air conditioning object space exhausted fluid (105) from the air conditioning object space (120);
- the coolant fluid pipeline (103) and the fluid exhausting path (1060) can be individually installed or jointly constituted as a pipeline structure.

* * * * *